United States Patent
Fang et al.

(10) Patent No.: US 8,352,653 B2
(45) Date of Patent: Jan. 8, 2013

(54) STORAGE VIRTUALIZATION SUBSYSTEM AND SYSTEM WITH HOST-SIDE REDUNDANCY VIA SAS CONNECTIVITY

(75) Inventors: Ching-Hua Fang, Taipei (TW); Ching-Te Pang, Yonghe (TW)

(73) Assignee: Infortrend Technology, Inc., Taipei Hsien (TW)

( * ) Notice: Subject to any disclaimer, the term of this patent is extended or adjusted under 35 U.S.C. 154(b) by 266 days.

(21) Appl. No.: 11/603,072

(22) Filed: Nov. 22, 2006

(65) Prior Publication Data
US 2007/0165660 A1     Jul. 19, 2007

Related U.S. Application Data

(60) Provisional application No. 60/597,317, filed on Nov. 23, 2005.

(51) Int. Cl.
*G06F 3/00* (2006.01)
*G06F 5/00* (2006.01)
*G06F 13/12* (2006.01)
*G06F 13/38* (2006.01)

(52) U.S. Cl. ............... 710/74; 710/36; 710/62
(58) Field of Classification Search .......... 710/74, 710/36, 62
See application file for complete search history.

(56) References Cited

U.S. PATENT DOCUMENTS

| | | | |
|---|---|---|---|
| 6,775,728 B2 * | 8/2004 | Zimmer et al. | 710/260 |
| 7,058,749 B2 | 6/2006 | Loffink | |
| 7,281,072 B2 * | 10/2007 | Liu et al. | 710/240 |
| 7,437,462 B2 * | 10/2008 | Marks et al. | 709/226 |
| 2003/0018927 A1 | 1/2003 | Gadir et al. | |
| 2003/0110330 A1 | 6/2003 | Fujie et al. | |
| 2004/0068561 A1 | 4/2004 | Yamamoto et al. | |
| 2005/0005062 A1 | 1/2005 | Liu et al. | |
| 2005/0125574 A1 * | 6/2005 | Foster et al. | 710/36 |
| 2005/0138154 A1 * | 6/2005 | Seto | 709/223 |

FOREIGN PATENT DOCUMENTS

| | | |
|---|---|---|
| CN | 1553346 | 12/2004 |
| CN | 1554055 | 12/2004 |
| CN | 1655540 | 8/2005 |
| FR | 2862455 | 5/2005 |

* cited by examiner

*Primary Examiner* — Chun-Kuan Lee
*Assistant Examiner* — Zachary K Huson
(74) *Attorney, Agent, or Firm* — Rosenberg, Klein & Lee

(57) ABSTRACT

This invention discloses a storage visualization subsystem and system with host-side redundancy via SAS connectivity. The I/O interconnect interface between the storage visualization controller and the host is a serial-attached SCSI (SAS) interface. At least one SAS expander is inserted on the I/O interconnect path of the host side to provide the function of device expansion. Or, a built-in virtual SAS expander is disposed inside the storage virtualization controller to provide multiple virtual IDs for each SAS port. When one controller in the storage virtualization controller pair malfunctions or fails, the invention provides solutions in accord with different embodiments so that the surviving controller can inherit the ID of the failed one. Thus, the host can keep functioning normally as it is not aware of any change in the device status.

41 Claims, 16 Drawing Sheets

STORAGE VIRTUALIZATION SUBSYSTEM AND SYSTEM WITH HOST-SIDE REDUNDANCY VIA SAS CONNECTIVITY

RELATED APPLICATIONS

This application claims priority to provisional patent application Ser. No. 60/597,317, filed Nov. 23, 2005, and entitled "Storage Virtualization Subsystem and System With Host-side Redundancy Via SAS Connectivity", which is incorporated herein by reference.

BACKGROUND OF THE INVENTION

1. Field of Invention

The invention relates to a redundant storage virtualization subsystem and system and, in particular, to a redundant storage virtualization subsystem and system with host-side SAS connectivity.

2. Related Art

Storage virtualization is a technology that virtualizes different sections of physical storage devices (PSDs) to be logical storage entities provided for a host system to access. The logical storage entities are referred to as the logical media units (LMUs) hereinafter. This technology is primarily used in the storage virtualization of a redundant array of independent disks (RAID). Using this RAID technology, smaller PSDs can be combined to form a LMU with a larger capacity, fault tolerance ability, and better efficiency.

The primary purpose of the storage virtualization controller (SVC) is to achieve the above-mentioned functions. The SVC maps combinations of sections of the PSDs to the LMUs visible to the host system. When an I/O request is received by the SVC from the host system, it is first parsed and interpreted, and then the associated operations and data are translated into the PSD I/O requests. This process may be indirect with operations cached, delayed (e.g. write-back), anticipated (read-ahead), grouped, etc., to improve the efficiency and other operational characteristics. Therefore, a host I/O request may not necessarily have directly one-to-one correspondence with a PSD I/O request.

An external (or stand-alone) SVC is a SVC that connects to the host system via an I/O interface. It is also capable of being connected to an external device resided out of the host system. Generally speaking, the external SVC operates independent of the host system.

An external (or stand-alone) direct-access RAID controller is one example of the external SVC. The RAID controller combines sections of one or more PSDs into LMUs. Their constitution is determined by the nature of a particular RAID level. The LMUs thus formed are contiguously addressable by the host system so that each LMU can be utilized. Typically, a single RAID controller can support many RAID levels. Therefore, different LMUs may consist of sections of PSDs combined in different fashions by virtue of different RAID levels. The different LMUs combined in different fashions have different characteristics of the RAID levels, respectively.

Another example of the external SVC is a JBOD emulation controller. A JBOD, short for "Just a Bunch of Drives", is a set of physical direct access storage devices that are directly connected to a host system via one or more multiple-device I/O device interconnect channels. An intelligent JBOD emulation device is used to emulate multiple multiple-device I/O device interconnects to directly access storage devices by mapping I/O requests to the physical direct access storage devices, which are connected to the JBOD emulation device individually via I/O device interconnect channels.

The RAID system often uses the concept of redundancy to ensure the security and availability of data. On the drive side, user data fault tolerance ability is achieved by storing one or more sets of redundant data. On the host side, a pair of SVCs is configured as a redundant pair, called the SVC pair, thereby solving the problem when a single SVC malfunctions or fails. The design of the SVC pair is to ensure the continuous data access for the host when only one SVC malfunctions or fails. This can be implemented by adding one function to the SVC pair to allow the surviving SVC to take over the other one's jobs when one of the SVC pair malfunctions or fails.

On the drive side of the RAID system, each of the two SVCs in the SVC pair has to be able to access all the PSDs, whether the PSD is originally assigned to be managed by it. On the host side, each SVC in the SVC pair must have the ability to present all accessible resources to the host for its use when its mate SVC is originally offline or first online then offline (because of being malfunctioned, failed, or maintained, etc). These accessible resources include those originally assigned to be managed by the mate SVC.

One representative implementation on the above-mentioned drive side is to use a multiple-initiator multiple-device type of drive-side I/O device interconnects, such as the optical fibre or the parallel small computer system interface (parallel SCSI). All of the drive-side I/O device interconnects are connected to the two SVCs. Therefore, any one of the two SVCs can access any PSDs connected to the drive-side I/O device interconnects. When the two SVCs are operating on line, each of the PSDs is managed by one of the SVC pair. As to which one of the SVC pair manages the PSD is determined by user's settings or the system configuration. For example, for a LMU composed of PSDs, all of the PSDs in the LMU are managed by the SVC specified by the LMU.

Another basic ingredient of the redundant storage virtualization system is that each of the SVC pair has to be able to monitor the status of the other one. This can be implemented using an inter-controller communications channel (ICC) disposed between the two SVCs and used to exchange the operating statuses of the two SVCs. This communications channel may be a dedicated one, whose sole purpose is to exchange the parameters and data related to the operations of the redundant storage virtualization subsystem. Alternatively, this communications channel is a single or multiple host-side or drive-side I/O device interconnects. Through this kind of interconnects, these parameters or data exchange in operations can be multitasking-transmitted along with data related to the host-SVC or drive-SVC I/O requests on these interconnects.

The commonly seen standards of the I/O interface between the SVC pair and the host are the fibre channel (FC) and the parallel SCSI. Both the FC and the parallel SCSI are multiple-device I/O device interconnects. The bandwidth of the multiple-device I/O device interconnect is shared by all the hosts and devices connected to it. The FC has good communication quality, fast speed, and high expansibility. However, its cost is very high. Although the parallel SCSI is a good choice under the consideration of cost/performance, its parallel transmission structure and shared bus characteristic largely limits its speed upgrade and extension potential in the future. Aside form the usual serial ATA (SATA) interface, the FC and the parallel SCSI interfaces are also the major drive-side I/O device interconnects for connecting the controller redundant pair to the PSDs.

To break through the bottleneck in the enhancement of speed performance for modem and future higher-speed transmissions, the serial-attached SCSI (SAS) interface is thereby come with the tide of fashion. The SAS adopts the verified advantages of the parallel SCSI (reliable, rich and mature command sets) as well as a new serial structure to achieve amazing transmission rate (3.0 Gbits/sec, or 6.0 Gbits/sec, or above) and considerable expansibility (up to connecting 16384 devices using expanders). The SAS technique has been implemented on the drive side on the market and is a mature product of the connection interface between the SVC(s) and the PSDs.

On the other hand, due to the peer-to-peer connection characteristic of the SAS, it cannot provide multiple device IDs to the host to identify as in the case of the FC or the parallel SCSI. Therefore, when it is used on the host side as the connection interface between the SVC(s) and the host, how to inherit the identity of the failed controller is a problem to overcome. At any rate, it is foreseeable that the advantages of high performance and expansibility of the SAS will enable it to be used on the host side in the near future.

The concept of redundancy is also implemented on an "initiator." The so-called "initiator" refers to the end that sends out commands. The SVC (or RAID system) that receives and executes the commands is considered as the "target." In practice, the initiator can be a host computer, such as a server system, workstation, personal computer (PC) or any other related computers, or even another SVC. The concept of redundancy on the initiator is practically achieved by using the multi-path I/O technology. It can provide multi-path connections from the initiator(s) to the target(s), achieving virtues including fault tolerance, high availability, better performance, etc.

SUMMARY OF THE INVENTION

It is an objective of the invention to provide a storage visualization subsystem and system with host-side redundancy via SAS connectivity and to provide a solution for the controller backup, so as to solve the problem that when one of the SVC pair fails, the surviving controller inherits the identity of the failed controller. Therefore, the host can continue to access data normally.

According to one embodiment of the invention, the storage visualization subsystem with host-side redundancy via SAS connectivity in connection with at least one initiator (e.g. a host computer) includes: a SVC pair, which has a first SVC and a second SVC for executing I/O operations in response to an I/O request sent from the initiator; at least one SAS expander, which is disposed on the path of the I/O device interconnect between the SVC pair and the initiator for providing the function of device expansion; and a PSD array, which has at least one PSD for providing storing space for the redundant storage virtualization subsystem. In particular, the signal (or frame) interconnect interface among the SVC pair, the expander, and the initiator is a SAS interface.

According to another embodiment of the invention, the storage visualization system with host-side redundancy via SAS connectivity includes: at least one initiator for sending out at least one I/O request; and at least one redundant storage virtualization subsystem, which is coupled to the initiator via a SAS signal (or frame) interconnect interface. Each of the at least one redundant storage virtualization subsystem further includes: one SVC pair, which has a first SVC and a second SVC for executing I/O operations in response to the I/O request sent out from the initiator; at least one SAS expander, which is disposed on the path of the I/O device interconnect between the SVC pair and the initiator for providing the function of device expansion; and a PSD array, which has at least one PSD for providing storing space for the redundant storage virtualization subsystem.

According to another embodiment of the invention, the storage visualization subsystem with host-side redundancy via SAS connectivity in connection with at least one initiator includes: a SVC pair, which has a first SVC and a second SVC for executing I/O operations in response to an I/O request sent from the initiator, and each of the first SVC and the second SVC has a built-in virtual SAS expander for providing each port with multiple virtual IDs; a switch component, which is disposed on the path of the I/O device interconnect between the SVC pair and the initiator; and a PSD array, which has at least one PSD for providing storing space for the redundant storage virtualization subsystem. In particular, the signal (or frame) interconnect interface between the SVC pair, and the initiator is a SAS interface.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The purpose to dispose two storage virtualization controllers (SVCs) in the redundant storage visualization subsystem to form a redundant pair, called the SVC pair hereinafter, is for backup, so that when one of the controllers malfunctions or fails, there is still a surviving one to allow the initiator (e.g. the host computer) to continuously access data. The two SVCs of the SVC pair basically operate independently, but exchange information. When any accident happens, in order to achieve the backup purpose, there should be some strategies such that the surviving controller can inherit the identity of the failed controller, while the initiator does not detect any status change in the controllers and continue to function normally.

Figure 1:
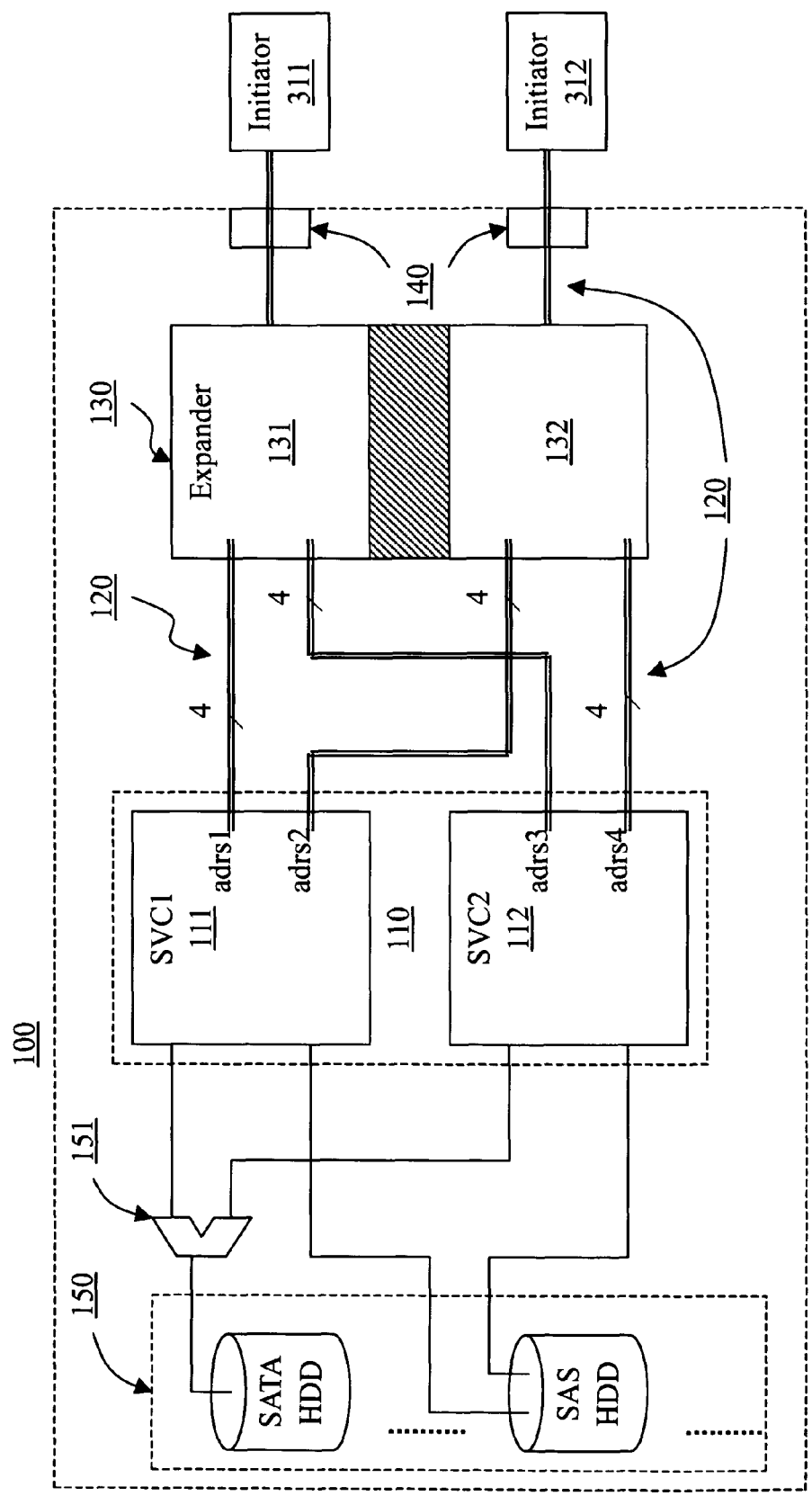
FIG. 1 is a block diagram of the first embodiment of the disclosed redundant storage virtualization subsystem.

With reference to FIG. 1, according to an embodiment of the invention the redundant storage virtualization subsystem 100 includes a SVC pair 110, at least one SAS expander 130, and a physical storage device (PSD) array 150. The interface between the SVC pair 110 and the SAS expander 130 and the one between the subsystem 100 and the initiators 311, 312 both are SAS interfaces 120. The SVC pair 110 has a first SVC 111 and a second SVC 112. The SVCs 111, 112 can be RAID controllers or JBOD emulators.

The structure of the redundant storage virtualization subsystem 100 further includes a dedicated peer-to-peer I/O device interconnect on the drive side. Such an I/O device interconnect can be the serial ATA (SATA), the serial-attached SCSI (SAS), or some other types such as the fibre channel (FC), the small computer system interface (SCSI), and the parallel ATA (PATA or IDE) for connecting the PSD array 150 to the SVC pair 110. Even though the SATA disk drive and SAS disk drive are used as two embodiments of the PSD in the following description, the PSD can be a disk drive adopting other interfaces such as the FC, SCSI, or IDE in other cases.

If the PSD is a SAS disk drive, there are two I/O ports provided itself. In the embodiment of FIG. 1, the two I/O ports are connected respectively to the first SVC (SVC1) 111 and the second SVC (SVC2) 112. In contrast, if the PSD is an SATA disk drive, a multiplexer (MUX) 151 is inserted on the path of the drive-side I/O device interconnect between the SVCs 111, 112 and each SATA disk drive. Therefore, both the SVCs 111, 112 can simultaneously and respectively connect to each SATA disk drive to allow the single I/O port of the SATA disk drive to be accessed by two (or more) SVCs 111, 112.

On the host side, the SAS technique is used as the host-side I/O device interconnect 120 between the disclosed redundant storage virtualization subsystem 100 and the initiators 311, 312. Due to the characteristic of peer-to-peer connection of the SAS technique, at least one SAS expander 130 is disposed on the path of the host-side I/O device interconnect 120 to provide the function of device expansion. Therefore, redundant interconnects are established between the SVC pair 110 and the initiators to achieve the redundancy effect, and thus two (or more) SVCs 111, 112 can be connected respectively to at least one initiator 311, 312. Generally speaking, the redundant storage virtualization subsystem 100 uses at least one head connector 140 (e.g., InfiniBand) as the connection interface with external devices (e.g., initiators 311, 312).

In the embodiment of FIG. 1, the redundant storage virtualization subsystem 100 is disposed with one SAS expander 130, which is divided into a first zone 131 and a second zone 132 using a zoning technique. The two SVCs 111, 112 are connected respectively to the two zones 131, 132 via the SAS interconnects 120. That is, the first SVC 111 is connected to the first zone 131 and the second zone 132 via the SAS interconnects 120. Likewise, the second SVC 112 is also connected to the first zone 131 and the second zone 132 via the SAS interconnects 120. Based on this structure and from the viewpoint of the initiators 311, 312, the initiator 311 communicates with the two SVCs 111, 112 via, for example, the first zone 131 of the SAS expander 130. Therefore, the initiator 311, the first zone 131, and the two SVCs 111, 112 form the first domain and the signal (or frame) channel thus formed is Channel 1. In contrast, the initiator 312, the second zone 132, and the two SVCs 111, 112 form the second domain and the signal (or frame) channel thus formed is Channel 2. From the viewpoint of the controllers, the first SVC 111 is connected via different paths of SAS interconnects 120 (e.g., Channel 1 and Channel 2) to the first zone 131 and the second zone 132 and communicates with the two initiators 131, 132.

A drive-side I/O device interconnect is disposed between each PSD in the PSD array 150 and the two SVCs 111, 112, respectively. A plurality of PSDs constitutes a logical unit number (LUN). Under normal conditions, the SVCs 111, 112 determine whether the LUN connected to them are under their management or not according to the configuration of the RAID system. For example, if the PSD array 150 has 20 LUNs, each LUN can be considered as a logical disk drive. Suppose that the first disk drive (Disk 0) to the tenth disk drive (Disk 9) are assigned to the first SVC 111 with their signals (or frames) moving along Channel 1, and that the eleventh disk drive (Disk 10) to the twentieth disk drive (Disk 19) are assigned to the second SVC 112 with their signals (or frames) moving along Channel 2. When any accident happens and the path originally assigned to a particular disk drive is broken, then the surviving SVC 111 or 112 will re-assign a new path so that the transmitted signals (or frames) of the disk drive have an alternate path. Taking the same example, if the first SVC 111 malfunctions or fails during its operation, then the transmission paths of the first disk drive (Disk 0) to the tenth disk drive (Disk 9) are re-assigned to the second SVC 112 for management after an initialization process. That is, all the disk drives are assigned to the second SVC 112. However, the signals (or frames) are still transmitted via Channel 1 and Channel 2, respectively, to the initiators 311, 312.

Figure 2:
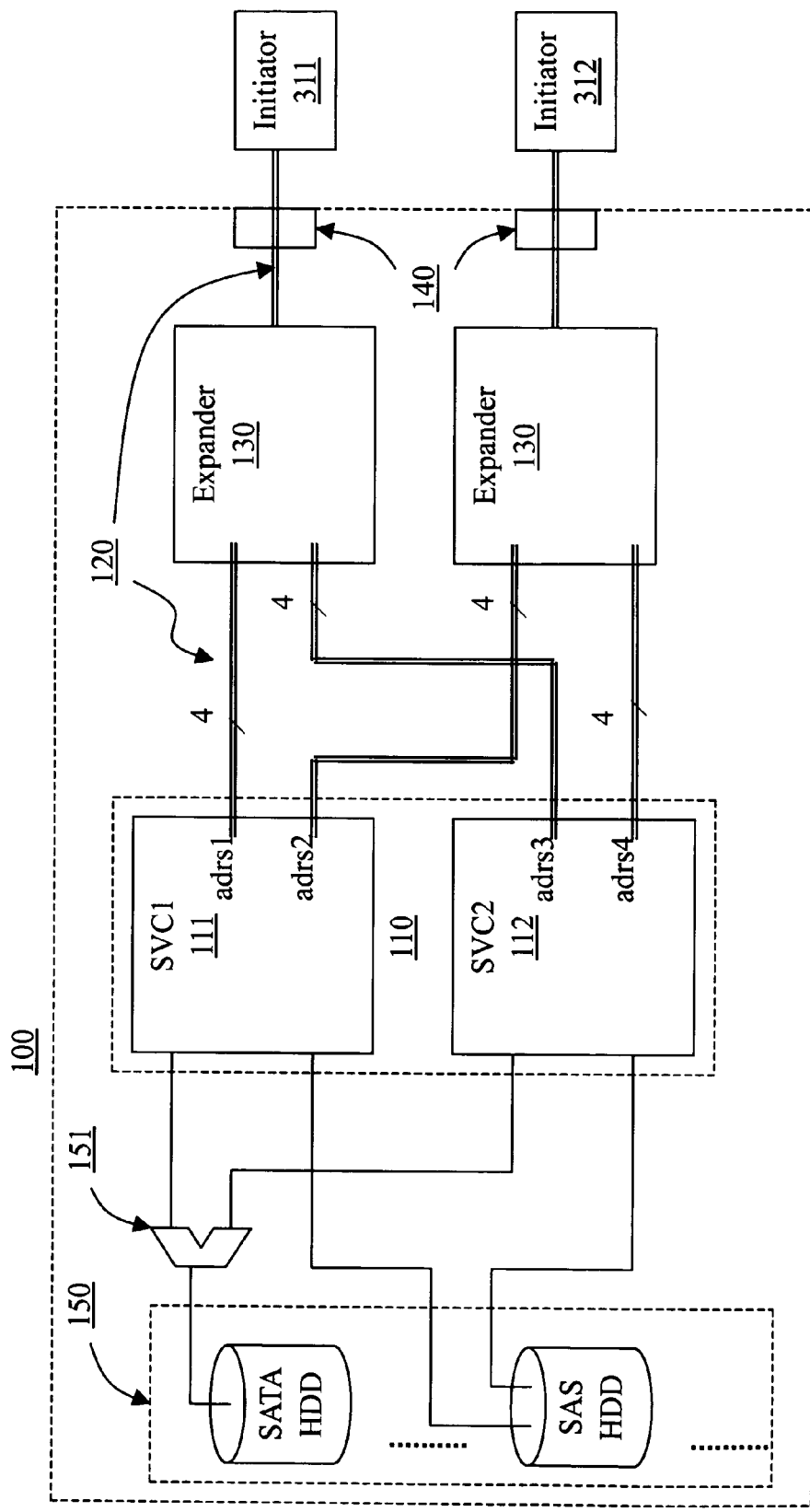
FIG. 2 is a block diagram of the second embodiment of the disclosed redundant storage virtualization subsystem.

Another embodiment of the invention is depicted in FIG. 2. The redundant storage virtualization subsystem 100 can be further disposed with two SAS expanders 130 connected between the two initiators 131, 132 and the two SVCs 111, 112, respectively, to play the roles of the first zone 131 and the second zone 132 in the SAS expander 130 of FIG. 1. Since their functions and effects are practically the same as in the description for FIG. 1 mentioned above, they are not repeated herein again.

In practice, the initiators 311, 312 in FIGS. 1 and 2 and the following drawings can be a host computer, such as a server system, workstation, PC, or some other related computers, or even another SVC. Besides, one host computer may be disposed with two host bus adapters (HBAs) (not shown in the drawing) as the two initiators 311, 312. Or, two ports of a single HBA can be the two initiators 311, 312. In an embodiment of the invention, the initiators 311, 312 further support the multi-path I/O technology in order to achieve the backup effect.

The topological structure of the redundant storage virtualization subsystem 100 and the initiators 311, 312 may be one redundant storage virtualization subsystem 100 connected with one or multiple initiators 311, 312, multiple redundant storage virtualization subsystems 100 connected with one initiator 311, 312, or multiple redundant storage virtualization subsystems 100 connected with multiple initiators 311, 312. Although the PSD array 150 in the drawing consists of a combination of several SATA disk drives and SAS disk drives, in practice, the PSD array 150 may purely consist of SATA disk drives or SAS disk drives, or purely consist of FC disk drives or SCSI disk drives as well. The multiplexer (MUX) 151 is only suitable for the connection with SATA disk drives. No such a multiplexer (MUX) 151 is required for other types of disk drives.

In the SAS system, the basic structure of a pair of emitting/receiving circuits is called a set of physical circuits or a PHY. One PHY forms a "narrow port." Two or more PHYs collectively form one "wide port." In the drawings of the invention, the SAS interconnect 120 uses "/" and a number to jointly indicate that the interconnect path is composed of the number of PHYs. For example, "/" and the number "4" means that the SAS interconnect 120 is a wide port composed of four PHYs.

In the embodiments shown in FIGS. 1 and 2, each of the two SVCs 111, 112 has two wide ports. Each wide port consists of 4 PHYs, called a 4-PHY wide port. The SVC pair 111, 112 provides each of the two 4-PHY wide ports a unique address for the devices (such as the initiators 311-312) connected to it to identify it. For example, the addresses of the two 4-PHY wide ports of the first SVC 111 are set as adrs1 and adrs2, respectively, and the addresses of the two 4-PHY wide ports of the second SVC 112 are set as adrs3 and adrs4, respectively. The port configuration of the SVC pair 111, 112 is not necessarily limited to two 4-PHY wide ports. There may be only one 4-PHY wide port or three or more wide ports. One consideration factor is to match with the number of the ports of the initiators 311, 312.

Figure 3:
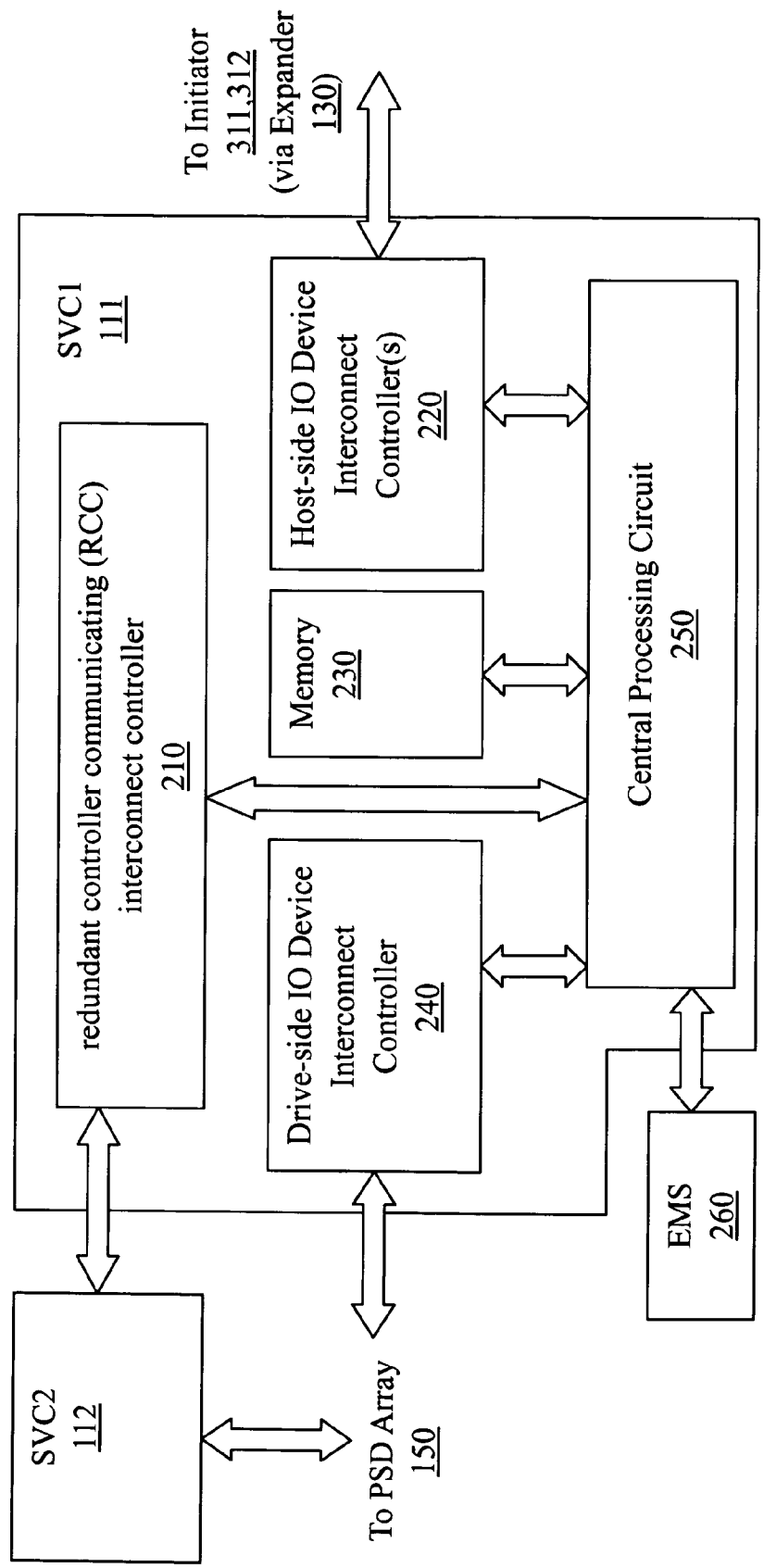
FIG. 3 is a functional block diagram of the disclosed SVC.

Taking the first SVC 111 as an example, FIG. 3 shows a block diagram of one embodiment of the SVCs 111, 112. The SVC 111 is connected to the second SVC 112, the initiators 311, 312 (or to the initiators 311, 312 via an SAS expander 130), and the PSD array 150. The PSD array 150 in this embodiment includes several SAS disk drives and/or several SATA disk drives. Here the first SVC1 111 has a host-side I/O device interconnect controller 220, a central processing circuit (CPC) 250, a memory 230, a drive-side I/O device interconnect controller 240, and a redundant controller communicating (RCC) interconnect controller 210. Although it is described here using separate functional blocks, parts or even all of the functional blocks can be integrated into a single chip in practice. For example, the RCC interconnect controller 210 and the host-side I/O device interconnect controller 220 can be integrated into a single chip.

The host-side I/O device interconnect controller 220 is connected to the CPC 250 and to the initiators 311, 312 via the SAS expander 130 as the interface and buffer between the first SVC (SVC1) 111 and the initiators 311, 312. It receives I/O requests and related data sent from the initiators 311, 312 and delivers them to the CPC 250 in order to convert and/or map the I/O requests and related data. The host-side I/O device interconnect controller 220 contains one or more host-side ports for coupling with the initiators 311, 312 (or with the initiators 311, 312 via the SAS expander 130). In this invention, the port type is SAS.

When the CPC 250 receives an initiator I/O request from the host-side I/O device interconnect controller 220, the CPC 250 analyzes the I/O request, executes some operations in response with the I/O request, and sends the requested data and/or information to the initiators 311, 312 via the host-side I/O device interconnect controller 220 of the first SVC 111. After the I/O request sent in from the initiators 311, 312 is analyzed, if the received request is a read request and one or more operations are executed as the response, the CPC 250 will then acquire the requested data from the interior or the memory 230 or both and send the data to the initiators 311, 312. If the requested data cannot be acquired from the interior or do not exist in the memory 230, the read request will be sent via the drive-side I/O device interconnect controller 240 to the PSD array 150. Afterwards, these requested data are sent from the PSD array 150 to the memory 230 and then to the initiators 311, 312 via the host-side I/O device interconnect controller 220. When a write request sent from the initiators 311, 312 reaches the CPC 250, the CPC 250 receives the data sent from the initiators 311, 312 via the host-side I/O device interconnect controller 220 and stores them in the memory 230. When the SVCs 111, 112 receive the write request, it is determined according to the configuration of the SVCs 111, 112 that the write request is processed using a "write back" mode or "write through" mode. If it is processed using the write back mode, its I/O complete response is first sent to the initiators 311, 312 before the CPC 250 actually performs the write operation. If the write request is processed using the write through mode, the I/O complete response will not be sent to the initiators 311, 312 until the data are actually written into the PSD array 150. For both the operations of the "write back" mode and "write through" mode, the data are sent via the CPC 250 to the PSD array 150. The memory 230 is connected to the CPC 250 as a buffer for the data transmitted between the initiators 311, 312 and the PSD array 150 via the CPC 250. In practice, the memory 230 can be a dynamic random access memory (DRAM). More explicitly, the DRAM can be a synchronous dynamic random access memory (SDRAM).

The drive-side I/O device interconnect controller 240 is disposed between the CPC 250 and the PSD array 150 as an interface and buffer between the SVCs 111, 112 and the PSD array 150. The drive-side I/O device interconnect controller 240 receives the I/O request and related data sent from the CPC 250 and delivers them to the PSD array 150.

In this embodiment, an enclosure management service (EMS) circuitry 260 is attached to the CPC 250 as a management circuit for the enclosure accommodating the PSD array 150. In other embodiments, the EMS circuitry 260 may further have other functions, such as the management of the heat-dissipating fan and/or the management of the power supply. However, the SVCs 111, 112 may have other configurations. For example, the EMS circuitry 260 may be omitted, or the EMS circuitry 260 is integrated into the CPC 250 according to different functional designs of products.

In this embodiment, the RCC interconnect controller 210 in the first SVC (SVC1) 111 is used to connect the CPC 250 and the second SVC (SVC2) 112. Therefore, the second SVC (SVC2) 112 can be attached to the first SVC (SVC1) 111 and the PSD array 150 can be accessed by the two SVCs 111, 112. Moreover, the control/data signals (or frames) sent from the initiators 311, 312 can be delivered from the CPC 250 to the second SVC (SVC2) 112 or further to other PSD arrays (not shown) via the RCC interconnect controller 210.

Figure 4:
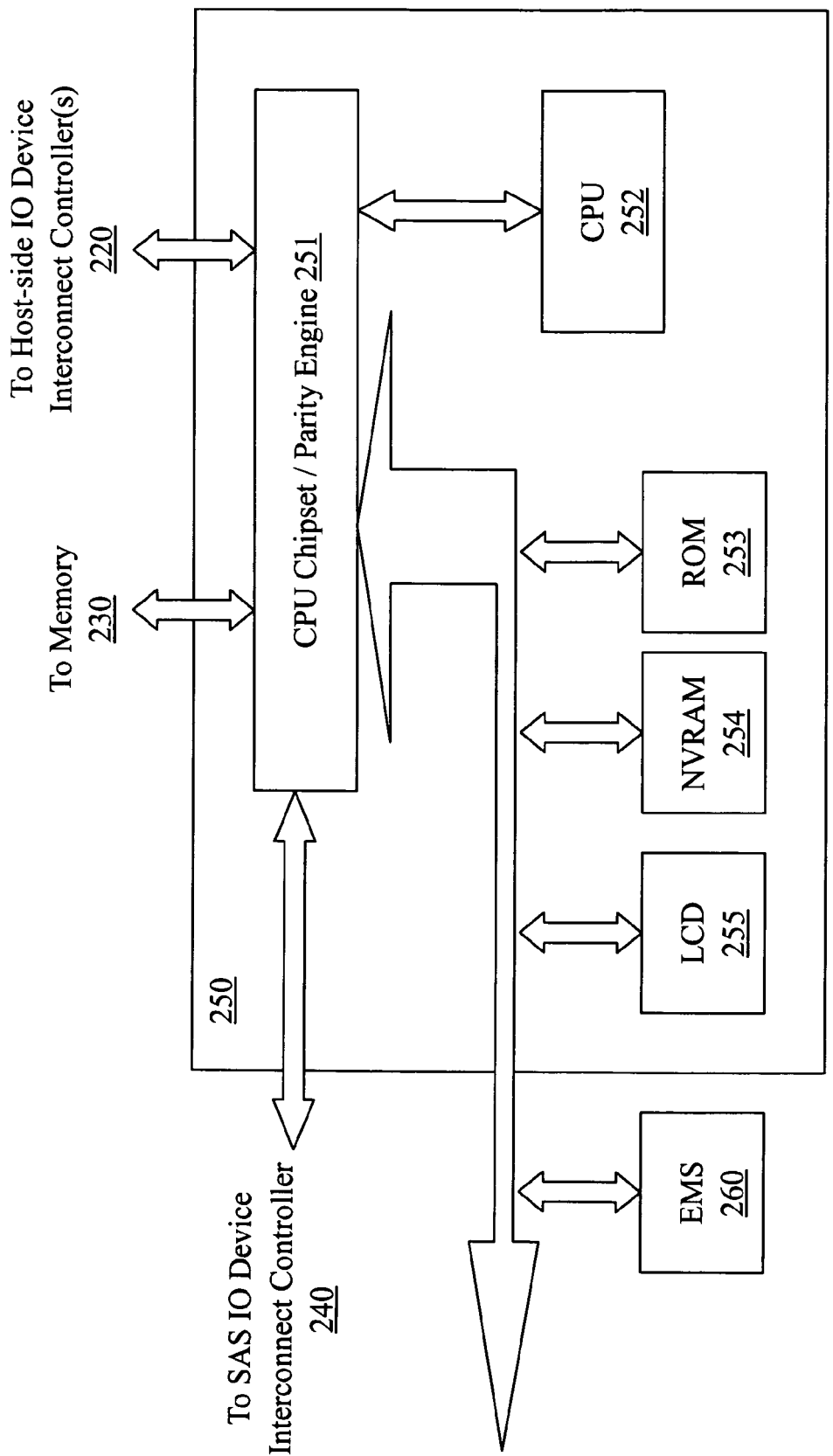
FIG. 4 shows the functional block diagram of an embodiment of the central processing circuit (CPC) in FIG. 3.

FIG. 4 gives an embodiment of the disclosed CPC 250, which includes a CPU chipset/parity engine 251, a central processing unit (CPU) 252, a read only memory (ROM) 253, a non-volatile random access memory (NVRAM) 254, a liquid crystal display (LCD) module 255, and an EMS circuitry 260. The CPU 252 can be, for example, a power PC CPU. The ROM 253 can be a flash memory for storing the basic input/output system (BIOS) and other programs, such as the controller kernel and various program modules. Wherein, the kernel is used to control the operations of the subsystem after it is booted. The NVRAM 254 is used to store setting information of various configurations of the SVCs 111, 112. The settings include the network IP, the device-side configuration, the host-side configuration, etc. The LCD module 255 is used to display the operation status of the subsystem. The EMS circuitry 260 is used to control the power of the PSD array and perform other managements. The ROM 253, the NVRAM 254, the LCD module 255, and the EMS circuitry 260 are connected to the CPU chipset/parity engine 251 via an X-bus. Furthermore, the NVRAM 254 and the LCD module 255 are optional items. In another embodiments, they may not be included.

Under normal operations, when the storage virtualization system (including the redundant storage virtualization subsystem 100 and the initiators 311, 312) starts, the CPC 250 in the SVCs 111, 112 first performs an initialization task. The kernel stored in the ROM 253 starts the initialization task. When executing the initialization task, the kernel will scan all the devices in the system, read the unique device ID of each device, and initialize the address of each port. It should be noted that the initialization task is executed independently by the first and second SVCs 111, 112. However, in the beginning of the initialization, the two SVCs 111, 112 first read a base address from a backplane, and then address each SAS port according to the base address. The backplane is disposed inside the redundant storage virtualization subsystem 100 (not shown), connected with the two SVCs 111, 112 for providing electric power, communication links, etc. It has a non-volatile storage medium and other passive components. The base address is stored in the non-volatile storage medium.

Figure 5:
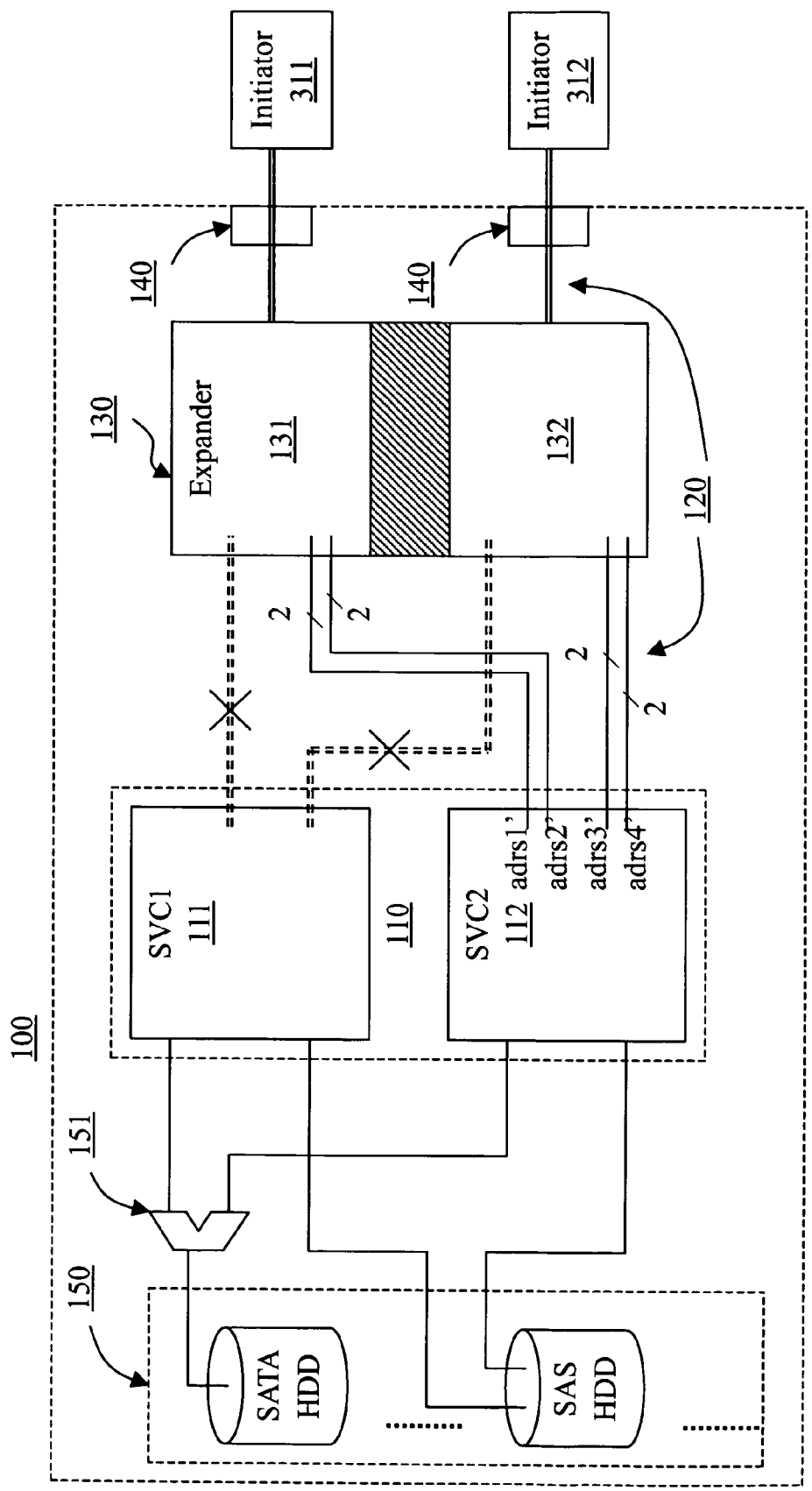
FIG. 5 is a block diagram showing the situation that the disclosed redundant storage virtualization subsystem fails.

Please refer to FIG. 5. During the operation of the system, suppose that the first SVC 111 malfunctions or fails, the two SAS connection paths connected with it apparently also fail. Because no response can be made after the device fails, the second SVC 112 can immediately detect and learn the device failure of the first SVC 111. In this case, in order to maintain the normal operation of the system, the redundant storage virtualization subsystem 100 has to have a strategy to keep the initiators 311, 312 being unaware of the device failure. Therefore, the data in the PSD array 150 can be continuously accessed via the second SVC 112, achieving the controller backup function of the SVC pair 110.

In the SAS system structure, the job of the port address allocation is assigned to the link layer, which is a lower layer thereof. However, the initiators 311, 312 communicate with the SVCs 111-112 by a higher-level SAS protocol transport layer. Taking advantage of this property, as long as the surviving second SVC 112 can take over the port addresses originally assigned to the failed first SVC 111, the initiators 311, 312 would not be aware of any change in the device status and keep functioning normally.

With further reference to FIG. 5, once device failure is detected, the surviving controller re-starts the initialization procedure, including re-reading the base address from the backplane and re-allocating the SAS port addresses accordingly. In order to allow the statuses of the SAS interconnects 120 "look like" the same before and after the failure, the surviving second SVC 112 first needs to divide the original two 4-PHY wide ports into four 2-PHY wide ports, each of which consists of two PHYs. If the addresses of the four 2-PHY wide ports are respectively adrs1', adrs2', adrs3', and adrs4', then the addresses that they represent have to be equal to those of the four 4-PHY wide ports before the failure (i.e., adrs1, adrs2, adrs3, and adrs4 in FIGS. 1 and 2).

In practice, for example, suppose that the SVCs 111-112 are adopting the chips produced by Adaptec Inc. Since the Adaptec chips have the address assigning function, regardless which one of the SVCs fails, it is only necessary to assign the addresses of the old four 4-PHY wide ports (adrs1, adrs2, adrs3, and adrs4) to the ones of the new four 2-PHY wide ports (adrs1', adrs2', adrs3', and adrs4') during the initialization process, thus achieving the effect of taking over the port addresses of the failed SVC. Another practical application is that the SVCs 111, 112 are adopting the chips produced by LSI Logic Corporation. The LSI Logic chips have a special characteristic: the addresses of two 4-PHY wide ports on the same control chip have a fixed difference of 4. Therefore, with reference to FIG. 6A, if the addresses of the two 4-PHY wide ports of the first SVC 111 are P and P+4 and the addresses of the two 4-PHY wide ports of the second SVC 112 are S and S+4, then setting S=P+1 is sufficient to achieve the effect of taking over the port addresses of the failed controller.

Figure 6B:
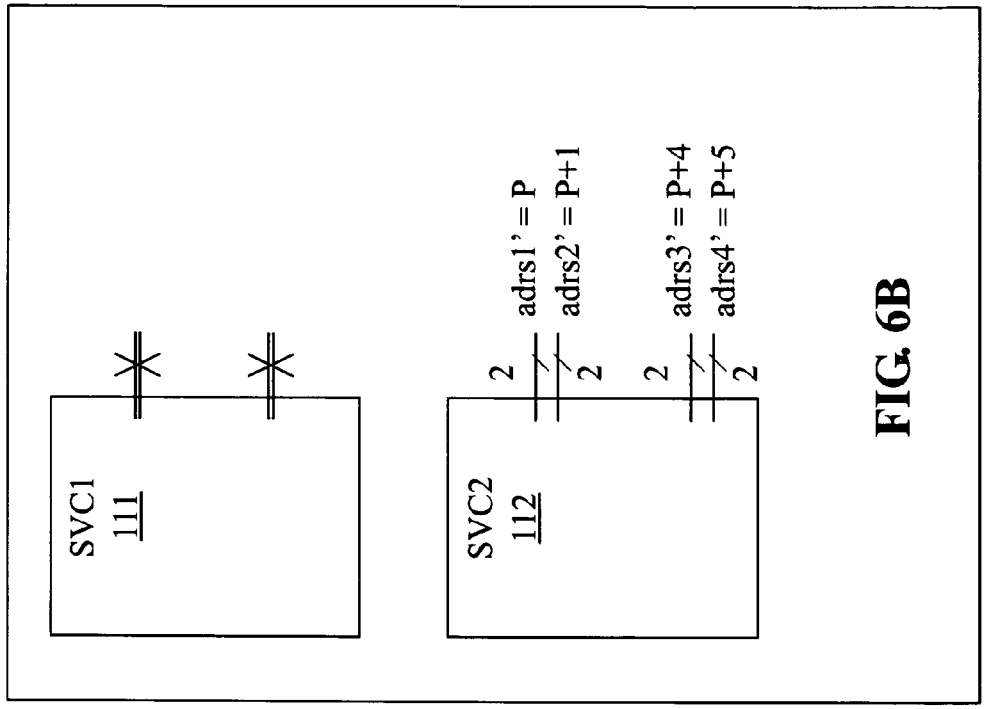
FIGS. 6A and 6B are schematic views showing the SAS port addresses of a LSI controller chip when the device is normal and failed, respectively.
Figure 6A:
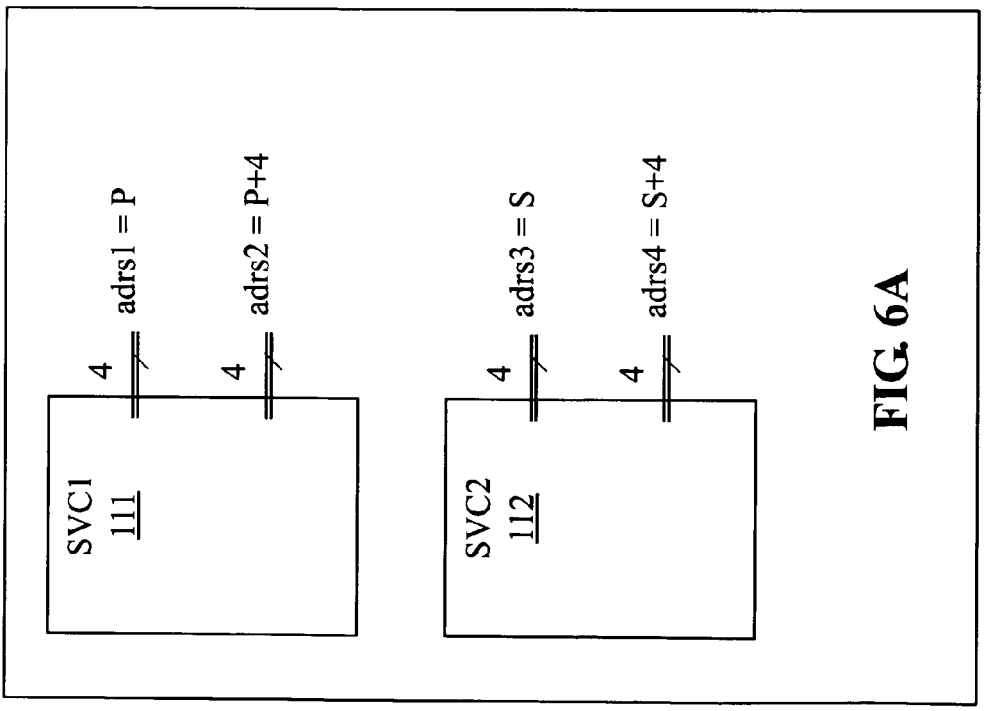

Referring to FIGS. 6A and 6B together, if the base address stored on the backplane is BA, in a normal condition BA is assigned to adrs1 during the system initialization. Since it has set S=P+1, the port addresses from adrs1 to adrs4 according to the LSI chip characteristic are:

adrs1=P=BA
adrs2=P+4=BA+4
adrs3=S=P+1=BA+1
adrs4=S+4=P+5=BA+5

That is, (adrs1, adrs2, adrs3, adrs4)=(BA, BA+4, BA+1, BA+5). If an accident happens (e.g., the first SVC 111 malfunctions or fails), an initialization process will be re-started. The two 4-PHY wide ports of the second SVC 112 are divided into four 2-PHY wide ports. The base address BA is assigned to adrs1'. According to the characteristic of the LSI Logic chips, the addresses from adrs1' to adrs4' are:

adrs1'=P=BA
adrs2'=P+1=BA+1
adrs3'=P+4=BA+4
adrs4'=P+5=BA+5

That is, (adrs1', adrs2', adrs3', adrs4')=(BA, BA+1, BA+4, BA+5). Therefore, the SAS port addresses before and after the device failure are the same when the base address BA are held fixed, achieving the purpose of taking over the port addresses of the failed controller. On the contrary, if the situation is that the second SVC 112 malfunctions or fails, using the same method can achieve the same effect. It should be noted that the mathematical relation of "S=P+1" is only one embodiment of practical applications. In practice, the relation between "P" and "S" can be adjusted according to different embodiments. Any such variation should be considered as part of the invention.

Figure 7:
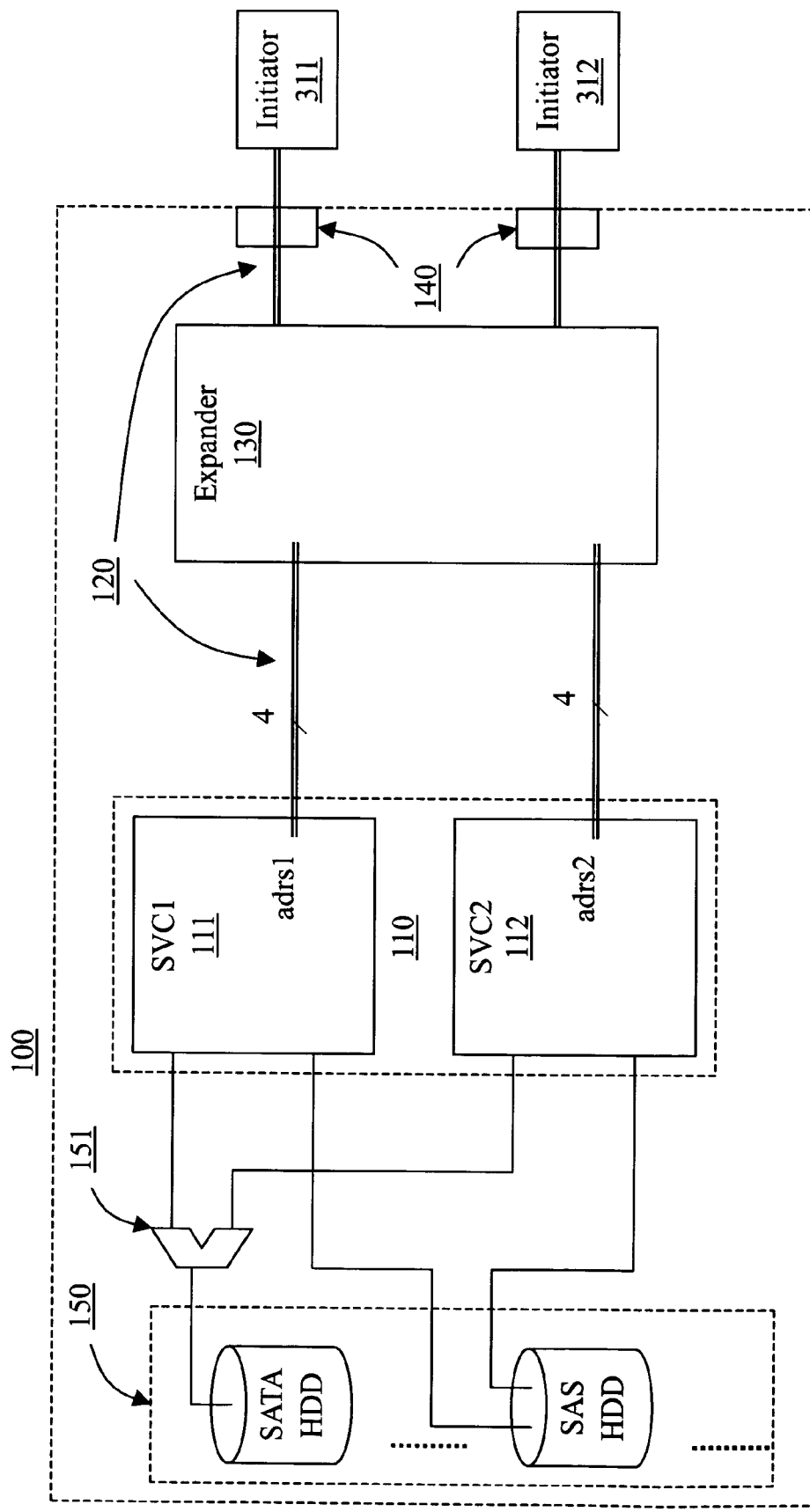
FIG. 7 is a block diagram of the third embodiment of the disclosed redundant storage virtualization subsystem.

FIG. 7 shows another embodiment of the disclosed redundant storage virtualization subsystem 100. As described above, the configuration of the ports of the SVCs 111, 112 is not necessarily limited to two 4-PHY wide ports. If the initiators 311, 312 do not need to lie in different "domains/channels," one can use the SVCs 111, 112 with only one 4-PHY wide port to save the cost. The redundant storage virtualization subsystem 100 in this configuration only allows the two SVCs 111, 112 to be connected with one SAS expander 130 and the SAS expander 130 cannot be divided by the zoning technique. Accordingly, the two initiators 311, 312 can communicate with the two SVCs 111, 112. The method of handling the failed control device in this embodiment is similar to the ones described above.

Figure 8:
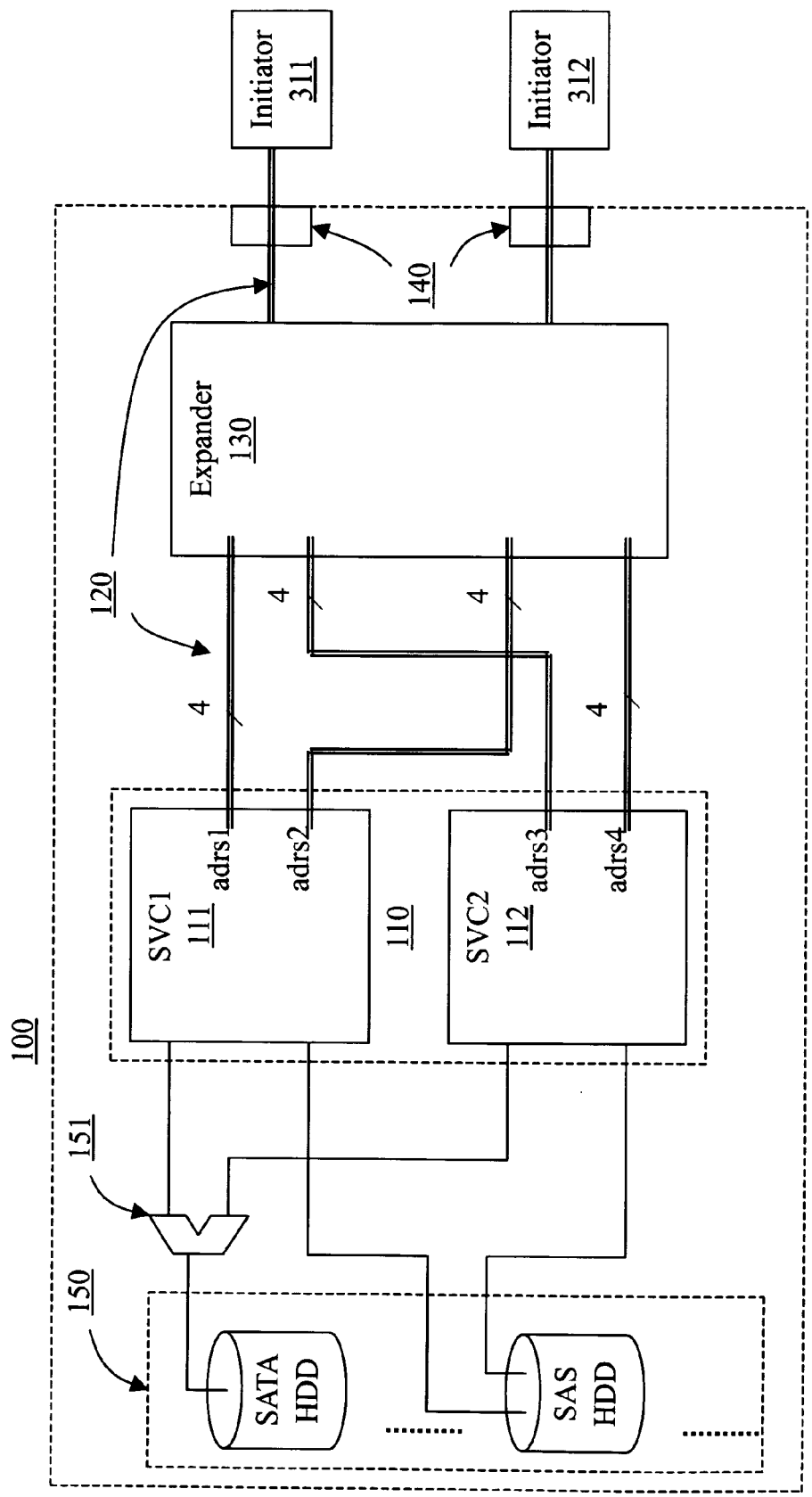
FIG. 8 is a block diagram of the fourth embodiment of the disclosed redundant storage virtualization subsystem.

FIG. 8 is yet another embodiment of the disclosed redundant storage virtualization subsystem 100. In comparison with the embodiment in FIG. 1, the difference is in that the SAS expander 130 is not divided into two zones by the zoning technique. In the embodiment of FIG. 1, the SAS expander 130 is zoned into a first zone 131 and a second zone 132. This clearly defines the initiator 311, the first zone 131, and the SVCs 111, 112 belonging to the "first domain". The signal (or frame) channel thus formed is "Channel 1". Moreover, this also defines the initiator 312, the second zone 132, and the SVCs 111, 112 belonging to the "second domain". The signal (or frame) channel thus formed is "Channel 2". Therefore, the initiators 311, 312 can recognize that the received signal (or frame) is from which channel of disk drive in the PSD array 150, without any determination. However, in FIG. 8, the zoning can be omitted without affecting the implementation of the invention if the initiators 311, 312 have the ability to determine that the received signal (or frame) is from "Channel 1" or "Channel 2".

The configuration of the SVCs 111, 112 has two types. The above-mentioned embodiments take the active-active mode as an example. In the active-active mode, the two SVCs 111, 112 simultaneously perform presentation, management and processing on the I/O requests of various LMUs in the disclosed storage virtualization subsystem 100. In the active-active mode, the two SVCs are always in a ready status to take over the other one if it is out of order or disabled due to malfunctioning. Therefore, the techniques described in the above-mentioned embodiments are required to solve the problem of address take-over for a failed controller when the host-side has an SAS interface.

Figure 9A:
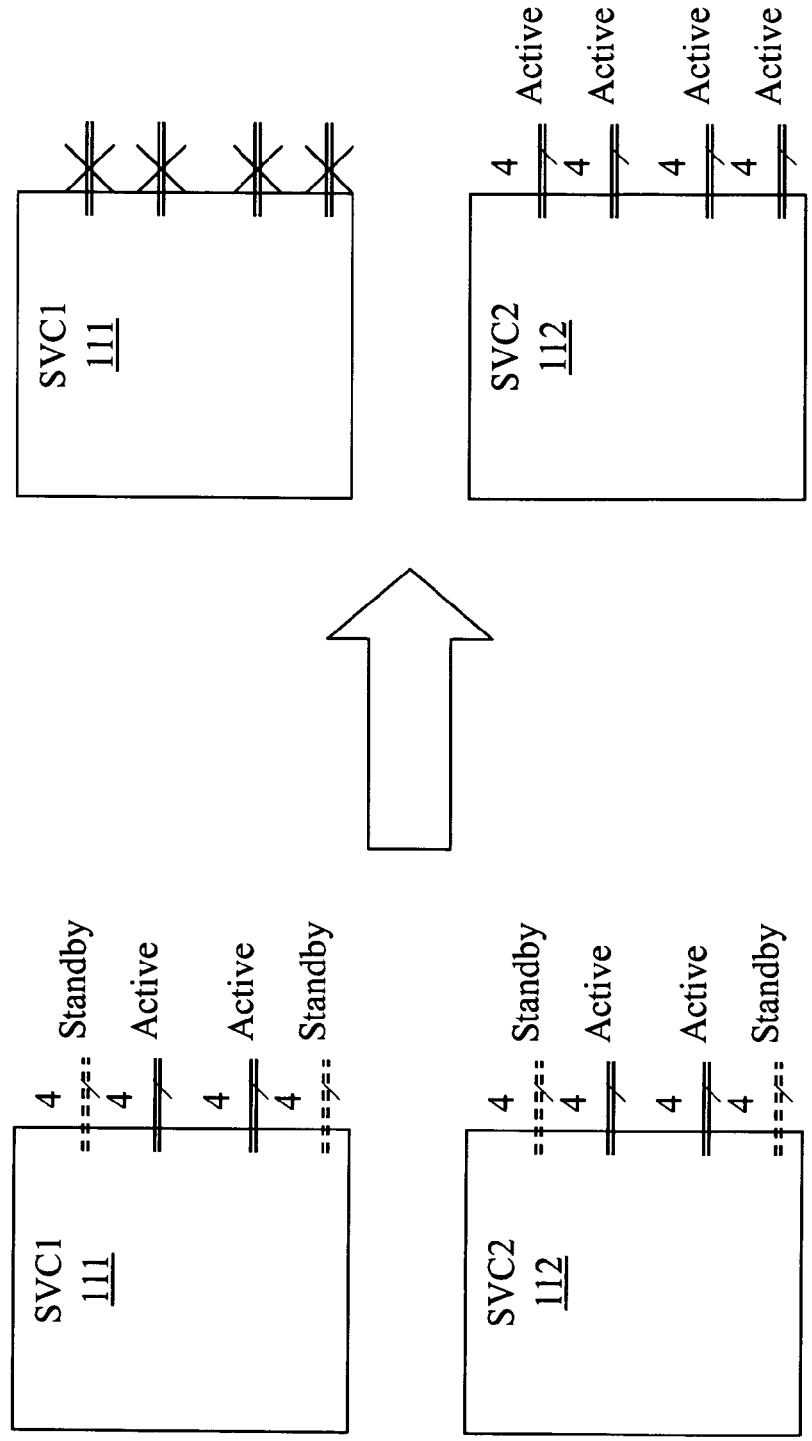
FIGS. 9A and 9B are schematic views of the disclosed SVC in the active-standby mode.

Another type of the SVC configuration is the active-standby mode. This mode has two possibilities. The first is that the two SVCs 111, 112 individually have one more time of the ports set in the standby state as a backup in addition to the active ports. With reference to FIG. 9A, if each of the SVCs 111, 112 in its normal operation requires two ports (set in the active mode) to transmit data, the SVCs 111, 112 should be physically equipped with four ports, in which two additional ones are set in the standby state. If one of the SVCs (e.g., the first SVC 111) malfunctions or fails, the backup SAS interconnects of the other SVC (e.g., the second SVC 112) can be enabled to process the flows originally processed by the first SVC 111.

Figure 9B:
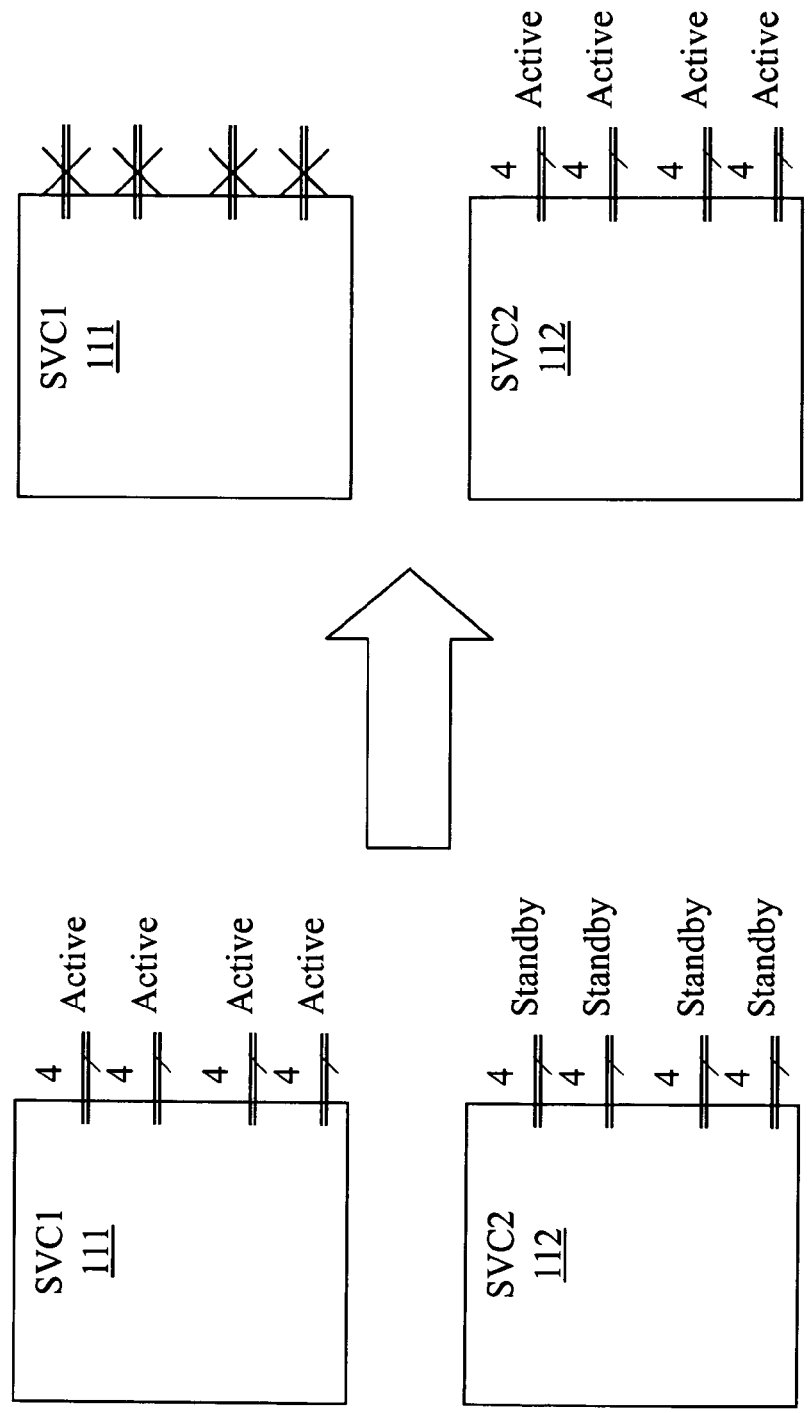

With reference to FIG. 9B, the second possibility of the active-standby mode is as follows. One of the SVCs (e.g., the first SVC 111) is set in the active mode to perform presentation, management and processing on all the I/O requests of all the LMUs in the storage virtualization subsystem 100. Oppositely, the other SVC (e.g., the second SVC 112) stays in the standby mode and gets ready to take over the active SVC at any time when it malfunctions or fails.

Since one objective of the invention is to implement SAS interconnects on the host side of the storage virtualization subsystem 100, it is applicable to adopt the two active-standby modes as the configuration of the SVCs 111, 112 to achieve "controller backup" for the storage virtualization controller 110.

Figure 10:
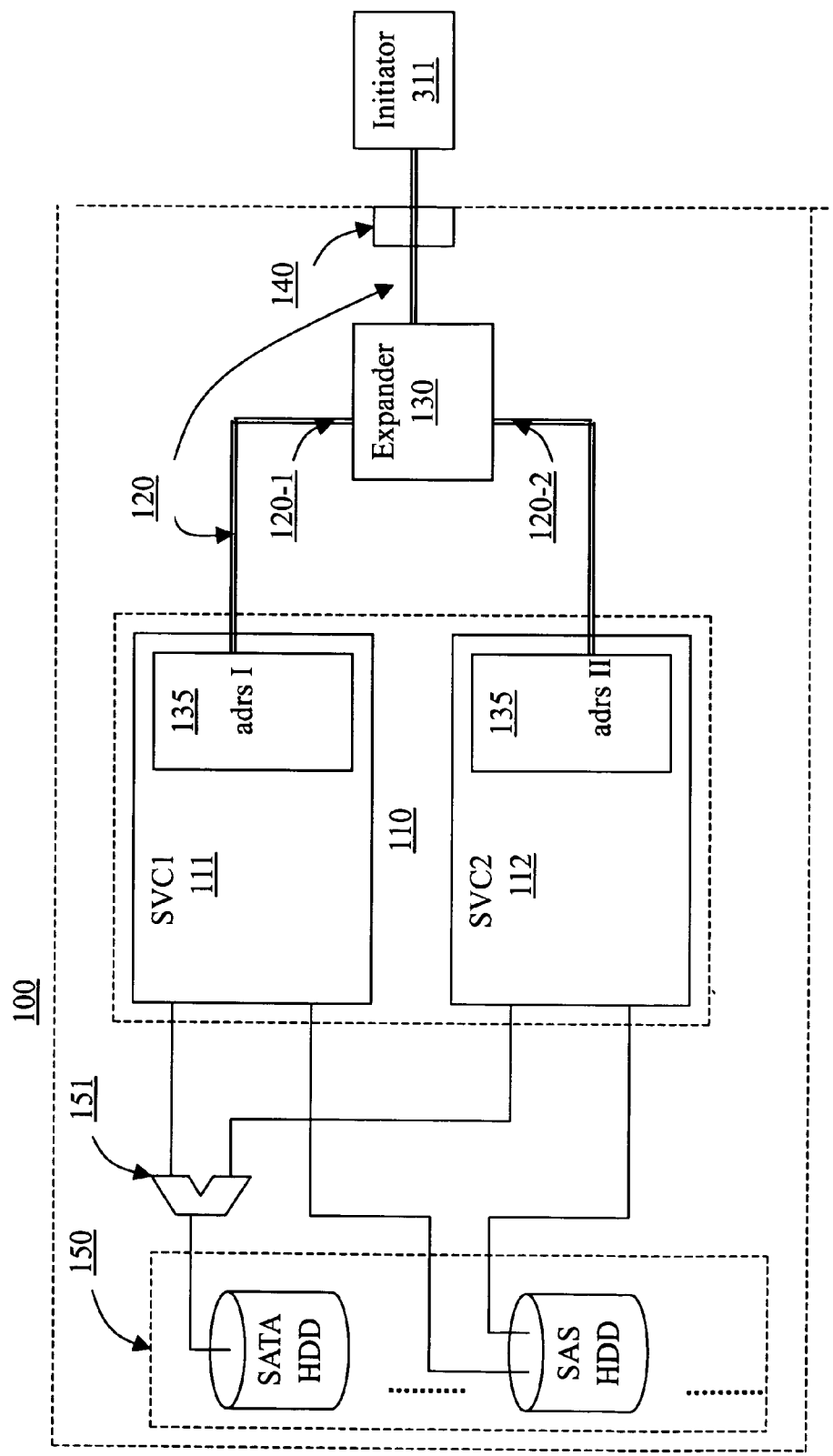
FIG. 10 is a block diagram of the fifth embodiment of the disclosed redundant storage virtualization subsystem.

Another method to implement the SAS interconnects on the host side of the storage virtualization subsystem 100 is to enable the SAS interconnect itself to be able to provide multiple IDs. However, the physical specification of the SAS technique defines that each SAS port can only have a unique "ID". This is why all the above-mentioned embodiments adopt the SAS expander 130 to expand the SAS connections with multiple devices. In order to achieve the effect that one SAS interconnect provides multiple IDs, another embodiment of the invention has "virtual SAS expanders" 135 built in the SVCs 111, 112, as shown in FIG. 10. This provides each SAS port with "multiple virtual IDs".

Figure 11:
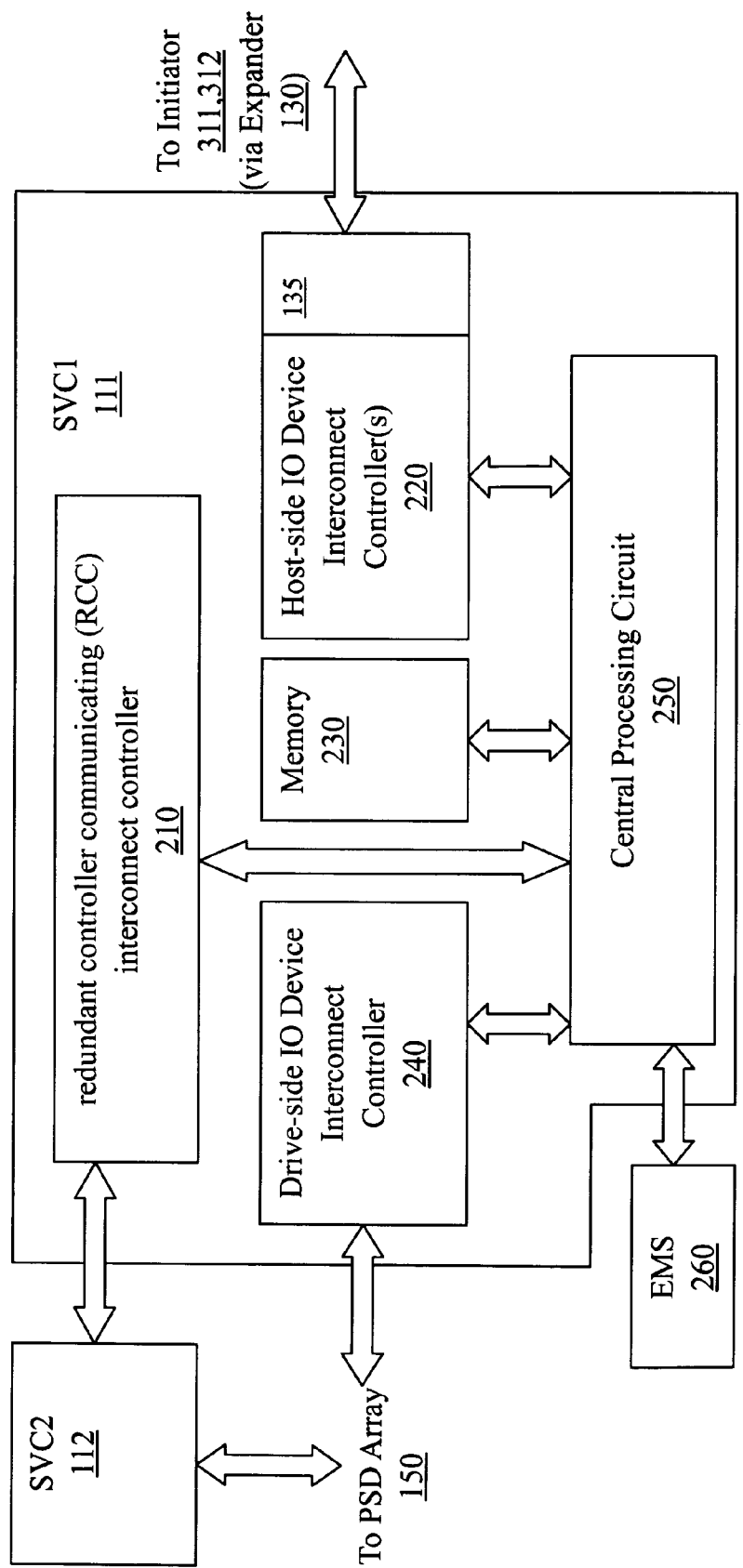
FIG. 11 shows the functional block diagram of the SVC with a built-in SAS expander according to the invention.

With reference to FIG. 11, the virtual SAS expander 135 is disposed on the host-side I/O device interconnect controller 220. Its program module can be built in the firmware of the SVCs 111, 112 (e.g., recorded in the ROM 253 as shown in FIG. 4), and uploaded to the host-side I/O device interconnect controller 220 after the system boots. The virtual SAS expander 135 provides each port with multiple virtual IDs. From another point of view, each virtual ID can be regarded as a virtual port or two virtual ports. The virtual SAS expander 135 has a "table" therein, recording the related information of each virtual port (or virtual ID), such as the connection state (e.g. connected or disconnected) and the corresponding address of its connection. Taking the embodiment of FIG. 10 as an example, each of the SVCs 111, 112 has two virtual ports inside, representing addresses of adrs I and adrs II, respectively. In the normal situation, one of the SVCs 111 or 112 only allows one of the virtual ports adrs I or adrs II to be in the connected state. That is, the table in the SVC 111 or 112 records the information of adrs I or adrs II. Meanwhile, the other virtual port in the same SVC 111 or 112 stays in the disconnected state. That is, the table does not record the address information of the disconnected port. For example, adrs I of the virtual SAS expander 135 of the SVC 111 is in the connected state, whereas adrs II is in the disconnected state. On the other hand, adrs II of the virtual SAS expander 135 of the SVC 112 is in the connected state, whereas adrs I is in the disconnected state. A switch component 130 is disposed on the interconnect path between the SVCs 111, 112 and the initiators 311, 312, providing the functions of establishing interconnects and transmitting signals (or frames). Normally, the switch component 130 records that adrs I is on the interconnect 120-1 of the virtual SAS expander 135 of the SVC 111 and adrs II is on the interconnect 120-2 of the virtual SAS expander 135 of the SVC 112. In this embodiment, the switch component is preferably an SAS expander 130.

From the viewpoint of the initiators 311, 312, they can simultaneously see the addresses of adrs I and adrs II of the two SAS ports. When the initiators 311, 312 send out an I/O request, it is transmitted via the SAS expander 130 to the SVC 111 or 112 where the target port of the I/O request is located. For example, if the target of the I/O request is adrs I, then the I/O signal (or frame) will be transmitted to the first SVC 111 for being processed.

When an accident happens during the operation of the system, such as the second SVC 112 malfunctions or fails, the surviving first SVC 111 will restart the initialization procedure and then update the table to be that the two virtual ports of adrs I and adrs II are both in the connection state. Therefore, for the SAS expander 130, adrs I and adrs II are both on the interconnect 120-1, and no more virtual port address exists on the interconnect 120-2. Consequently, from the viewpoints of the initiators 311, 312, the addresses of the two SAS ports of adrs I and adrs II are still existent, without any device change being detected. However, all the I/O requests afterwards are received and processed by the first SVC 111. A feature of this embodiment is that when an accident happens and the surviving SVC 111 or 112 has to take over the ID of the failed SVC 112 or 111, no division needs to be done to any physical port.

In this embodiment, the inner composition of the SVCs 111, 112 is similar to those shown in FIGS. 3 and 4, except that there is an additional program module of the virtual SAS expander 135 stored in ROM 253. As to the drive-side is the same as the previous embodiments and thus is not further described herein.

In other embodiments of the invention, multiple storage virtualization subsystems 100 can be further connected in series (except for the embodiment in FIG. 10) to serve the initiators 311, 312 by expanding the storing space. Please refer to FIG. 12, in which the structure of the storage virtualization subsystem 100 in FIG. 2 is used as an example and it is simplified by just depicting two SVCs 111, 112 and two SAS expanders 130 to represent the entire subsystem 100. The serial connection between the multiple storage virtualization subsystems 100 is physically achieved by connecting the ports of the SAS expanders 130. The topological structure of the connection can be classified into several types according to the requirements and conditions.

Figure 12:
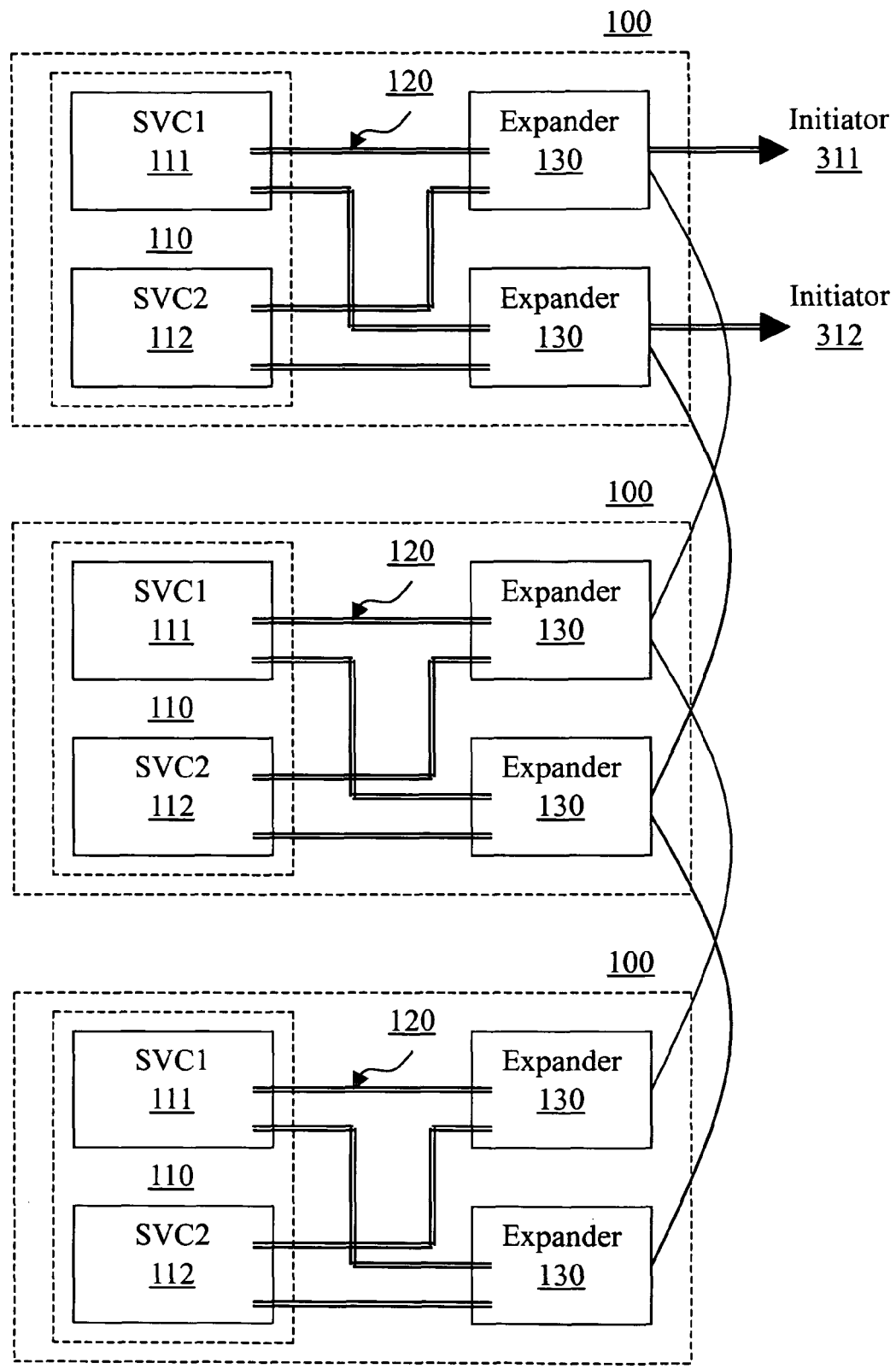
FIG. 12 shows the topological structure of connecting a redundant storage virtualization system to other redundant storage virtualization subsystems in series according to the first embodiment of the invention.

The serial connection in FIG. 12 shows a cascading structure, which connects adjacent storage virtualization subsystems 100 in series. For example, when the original storage virtualization system (including the first storage virtualization subsystem 100 and the initiators 311, 312) needs to cascade another storage virtualization subsystem 100, the first SAS expander 130 of the first storage virtualization subsystem 100 is connected to the first SAS expander 130 of the second storage virtualization subsystem 100, and likewise, the second SAS expander 130 of the first storage virtualization subsystem 100 is connected to the second SAS expander 130 of the second storage virtualization subsystem 100. If the system needs to further cascade a third storage virtualization subsystem 100, then in the similar way, the first SAS expander 130 of the second storage virtualization subsystem 100 is connected to the first SAS expander 130 of the third storage virtualization subsystem 100 and the second SAS expander 130 of the second storage virtualization subsystem 100 is connected to the second SAS expander 130 of the third storage virtualization subsystem 100. More storage virtualization subsystems can be cascaded following this scheme. Although this cascading manner is simple, there is a serious drawback: once a storage virtualization subsystem 100 cascaded in the middle malfunctions or fails, all the storage virtualization subsystems 100 after it cannot be accessed by the host.

Figure 13:
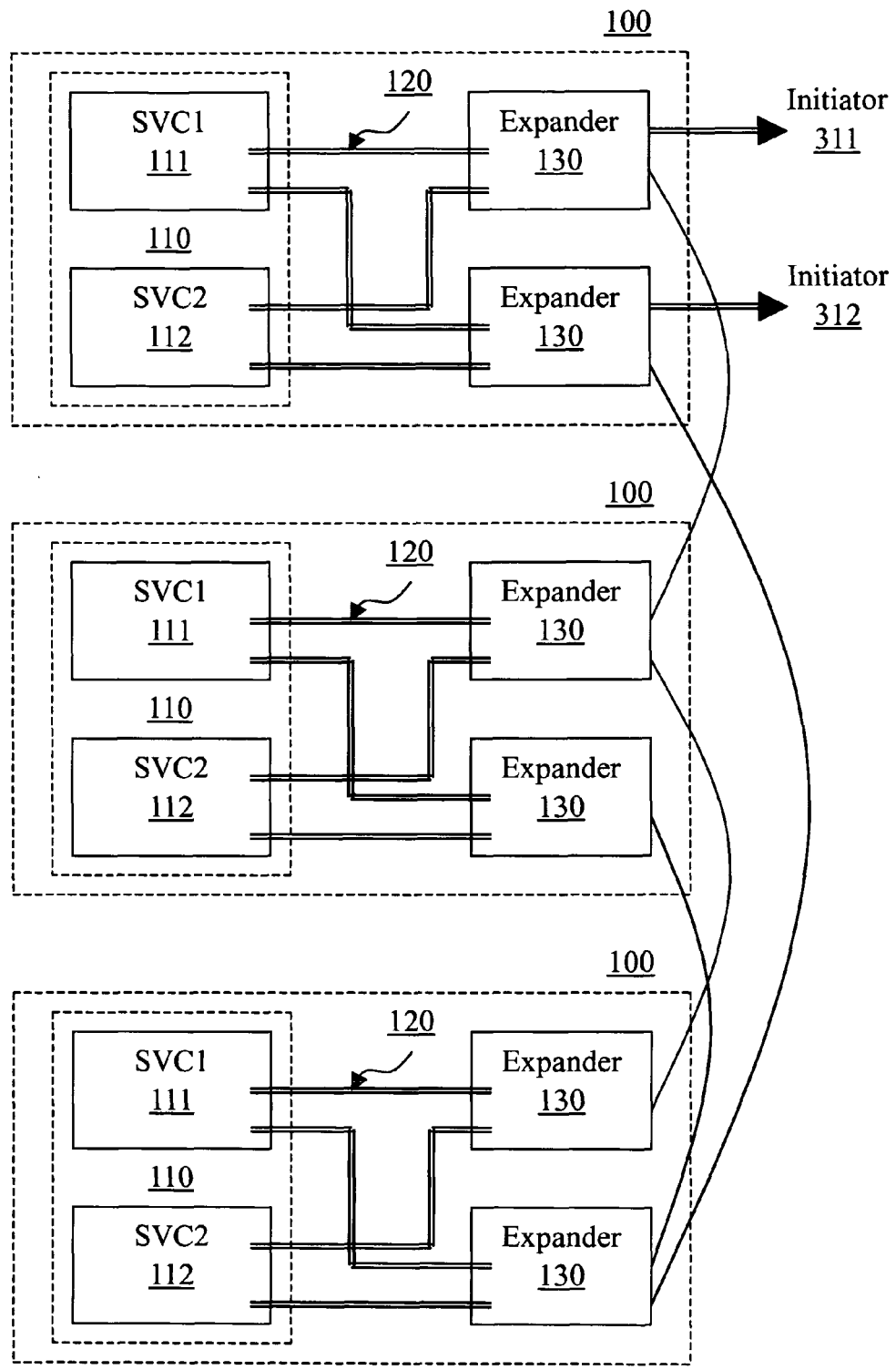
FIG. 13 shows the topological structure of connecting a redundant storage virtualization system to other redundant storage virtualization subsystems in series according to the second embodiment of the invention.

To overcome the above-mentioned drawback, some improvement is done on the cascading structure even though the changed topology basically looks like the cascading structure as shown in FIG. 11. For example, as shown in FIG. 13, the first SAS expanders 130 of the storage virtualization subsystems 100 still follow the connection scheme used in FIG. 12. That is, the first SAS expander 130 of the first storage virtualization subsystem 100 is connected to the first SAS expander 130 of the second storage virtualization subsystem 100, the first SAS expander 130 of the second storage virtualization subsystem 100 is connected to the first SAS expander 130 of the third storage virtualization subsystem 100, and so on. This connection sequence is represented as a "1-2-3 type connection". However, the connection sequence of the second SAS expanders 130 of the storage virtualization subsystems 100 is slightly modified as: the second SAS expander 130 of the first storage virtualization subsystem 100 is connected to the second SAS expander 130 of the last storage virtualization subsystem 100, which is then connected to the second SAS expander 130 of its previous storage virtualization subsystem 100, and so on. It is represented as a "1-3-2 type connection". As a result, even if a storage virtualization subsystem 100 cascaded in the middle malfunctions or fails, the initiator 312 can still access the storage virtualization subsystem(s) 100 connected after the failed one via its connection to the last storage virtualization subsystem 100. Although FIG. 13 shows that the first SAS expanders 130 of the storage virtualization subsystems 100 adopt the "1-2-3 type connection" whereas the second SAS expanders 130 of the storage virtualization subsystems 100 adopt the "1-3-2 type connection", this is only one possible embodiment. Another scheme may be adopted in other embodiments. For example, the connection sequences of the first SAS expanders and the second SAS expanders can be interchanged. That is, the first SAS expanders of the storage virtualization subsystems 100 adopt the "1-3-2 type connection" whereas the second SAS expanders 130 of the storage virtualization subsystems 100 adopt the "1-2-3 type connection."

Figure 14:
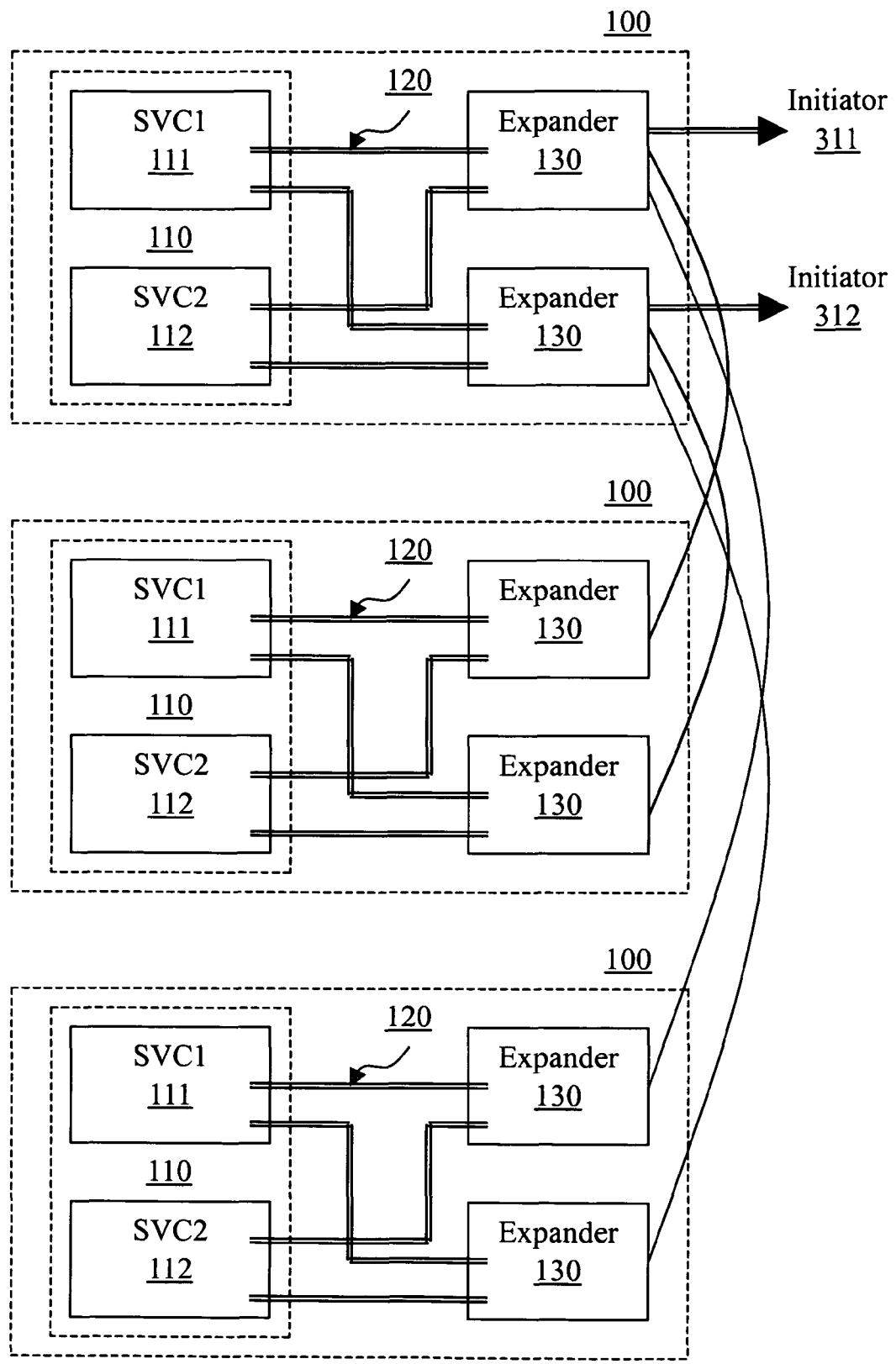
FIG. 14 shows the topological structure of connecting a redundant storage virtualization system to other redundant storage virtualization subsystems in series according to the third embodiment of the invention.

FIG. 14 shows another topological structure of the connection of multiple storage virtualization subsystems 100. The first storage virtualization subsystem 100 is connected to each subsequently connected storage virtualization subsystem 100. As a consequence, the first storage virtualization subsystem 100 plays a role similar to a switch. The initiators 311, 312 can communicate with other storage virtualization subsystems 100 via the first one. A premise of implementing this topological structure is that the number of ports on the SAS expander 130 of the first storage virtualization subsystem 100 has to be plenty enough. Otherwise, it considerably restricts the number of expanded storage virtualization subsystems 100.

In the embodiments from FIGS. 12 to 14 mentioned above, the storage virtualization subsystems 100 may be turned into the embodiment of the storage virtualization subsystem 100 in FIG. 1. That is, there is only one SAS expander 130, but divided into two zones in place of the embodiment equipped with two SAS expanders 130. In this case, the connection between any two storage virtualization subsystems 100 is that the first zones of the SAS expanders are connected to each other, and the second zones of the SAS expanders are connected to each other. In other embodiments of the invention, the two different storage virtualization subsystems 100 in FIGS. 1 and 2 can be adopted, each with an arbitrary number, to mutually cascade, forming topological structures similar to those in FIGS. 12 to 14.

Figure 15:
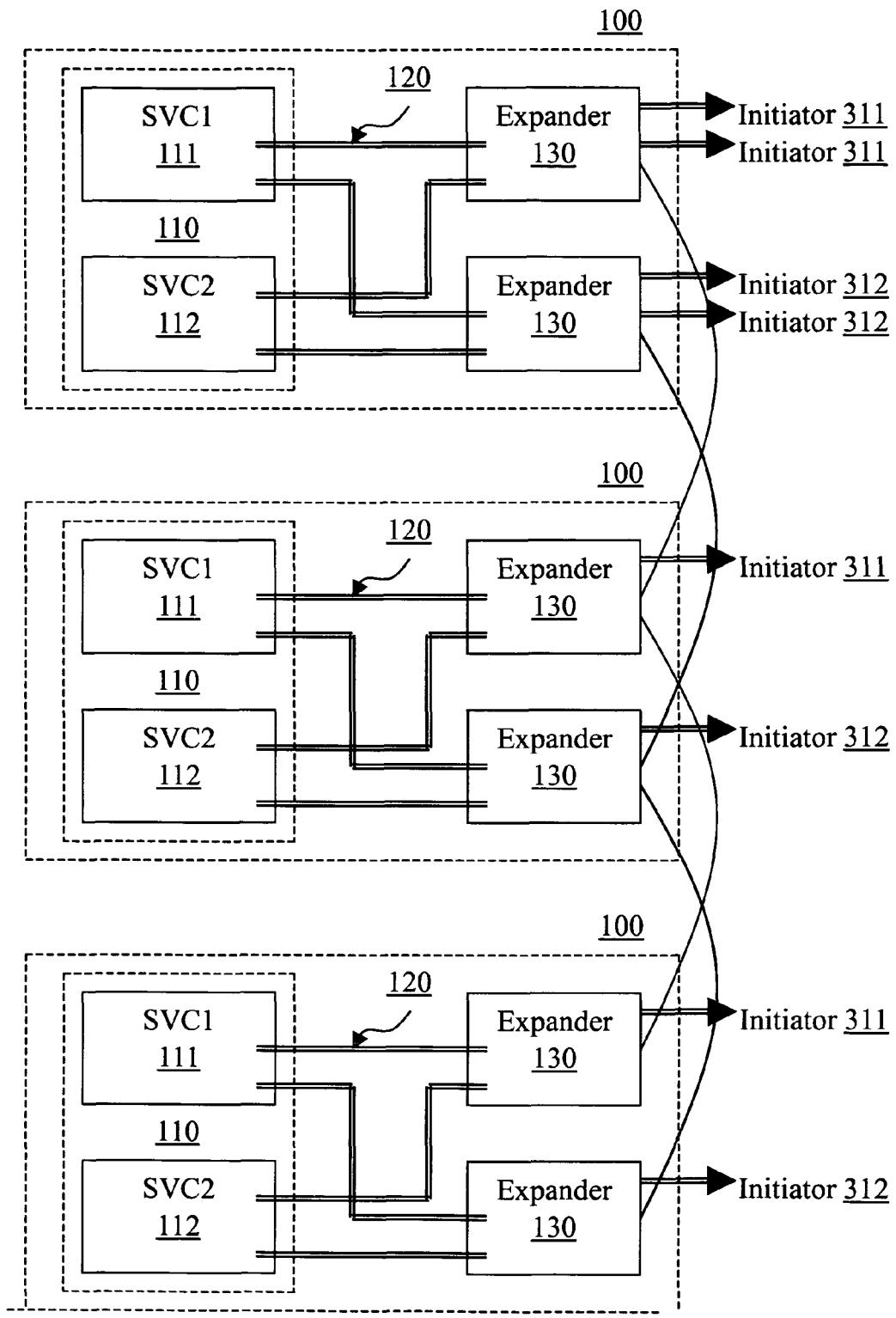
FIG. 15 is a schematic view showing the topological structure of the connections among multiple redundant storage virtualization systems according to the invention.

FIGS. 12 to 14 describe the embodiments of expanding a storage virtualization system (including a storage virtualization subsystem 100 and hosts 311, 312) by connecting with more storage virtualization subsystems 100. In other embodiments of the invention, different storage virtualization systems (each including a storage virtualization subsystem 100 and initiators 311, 312) can be connected according to various requirements. For example, as shown in FIG. 15, three different storage virtualization systems can be connected in a cascading way. The number of initiators 311, 312 in each storage virtualization system can be different and varied according to various requirements and not necessary to be limited to the case that one storage virtualization subsystem 100 can only be connected to one or two initiators 311, 312. If there is sufficiently plenty ports on the SAS expander(s) 130, more than 3 initiators connected to the storage virtualization subsystem 100 is also possible.

In summary, the embodiments in FIGS. 12 to 15, several different storage virtualization systems or storage virtualization subsystems 100 each with an SAS interface on the host side are connected in a daisy chain way, so that their resources can be shared. This effectively increases the storing space of the served initiators 311, 312.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage virtualization subsystem with host-side redundancy via serial-attached Small Computer System Interface (SAS) connectivity connected to at least one initiator, the subsystem comprising:
   a storage virtualization controller (SVC) pair including a first SVC and a second SVC for executing an Input/Output (I/O) operation in response to an I/O request sent from the initiator, wherein each SVC of the SVC pair comprises at least one I/O device interconnect controller and the I/O device interconnect controller has at least one host-side port for coupling to the initiator;

at least one SAS expander disposed on the path of an I/O device interconnect between the SVC pair and the initiator for providing the device expansion function comprising addressing and routing; and a physical storage device (PSD) array comprising at least one PSD for providing storing space to the subsystem;

wherein the signal interconnect interface among the SVC pair, the SAS expander, and the initiator is a SAS interface.

2. The subsystem of claim 1, wherein the PSD in the PSD array is coupled to the SVC pair via a peer-to-peer serial signal interconnect.

3. The subsystem of claim 2, wherein the peer-to-peer serial signal interconnect is a Serial Advanced Technology Attachment (SATA) interface and the PSD is a SATA disk drive.

4. The subsystem of claim 3 further comprising a multiplexer (MUX) coupled between the SATA disk drive and the SVC pair for processing the I/O signal transmitted between the SATA disk drive and the SVC pair.

5. The subsystem of claim 2, wherein the peer-to-peer serial signal interconnect is a SAS interface.

6. The subsystem of claim 1, wherein the interconnect interface of the at least one PSD in the PSD array is a fibre channel or SCSI interface.

7. The subsystem of claim 1, wherein each the SVC in the SVC pair further comprises:

a central processing circuit (CPC) for executing the I/O operation in response to the I/O request sent from the initiator;

an RCC interconnect controller coupled between the CPC and the other SVC of the SVC pair; and a memory coupled to the CPC as a buffer for buffering data transmitted between the initiator and the PSD array via the CPC, wherein the at least one I/O device interconnect controller further comprises:

a host-side I/O device interconnect controller coupled to the CPC and to the initiator via the expander as an interface between the SVC and the initiator; and a drive-side I/O device interconnect controller coupled between the CPC and the PSD array as an interface between the SVC and the PSD array.

8. The subsystem of claim 7, wherein the host-side I/O device interconnect controller further comprises at least one SAS host-side I/O device port.

9. The subsystem of claim 1, wherein each the SVC in the SVC pair further comprises:

a central processing circuit (CPC) for executing the I/O operation in response to the I/O request sent from the initiator, wherein the at least one I/O device interconnect controller coupled to the CPC further comprises:

at least one host-side I/O device port disposed in one of the at least one I/O device interconnect controller for coupling to the initiator; and at least one drive-side I/O device port disposed in one of the at least one I/O device interconnect controller for coupling to the PSD via a peer-to-peer serial signal interconnect.

10. The subsystem of claim 9, wherein one of the at least one host-side I/O device port and one of the at least one drive-side I/O device port are disposed in the same I/O device interconnect controller.

11. The subsystem of claim 9, wherein one of the at least one host-side I/O device port and one of the at least one drive-side I/O device port are disposed in different the I/O device interconnect controllers.

12. The subsystem of claim 9, wherein the at least one host-side I/O device port is a SAS port.

13. The subsystem of claim 8 or 9, wherein each of the first SVC and the second SVC has two of the host-side I/O device ports.

14. The subsystem of claim 8 or 9, wherein each of the at least one host-side I/O device port consists of four PHYs, forming a 4-PHY wide port.

15. The subsystem of claim 14, wherein when one SVC of the SVC pair malfunctions or fails, each of the 4-PHY wide ports of the surviving SVC is divided into two 2-PHY wide ports, and all of the 2-PHY wide ports take over the IDs of all of the 4-PHY wide ports when no SVC failure happens.

16. The subsystem of claim 14, wherein the address of the first 4-PHY wide port of the first SVC is equal to a base address and the address of the first 4-PHY wide port of the second SVC is equal to the base address added by an appropriate value.

17. The subsystem of claim 16, wherein the appropriate value is 1.

18. The subsystem of claim 15, wherein an initialization procedure is started to assign the addresses of all the new 2-PHY wide ports equal to the addresses of all the 4-PHY wide ports before the device fails.

19. The subsystem of claim 18, wherein the initialization procedure is started by a kernel.

20. The subsystem of claim 19, wherein the kernel is stored in a ROM of the CPC.

21. The subsystem of claim 16, wherein the base address is stored in a backplane which has an electrical connection to each of the SVCs.

22. The subsystem of claim 1, wherein the number of the at least one expander is 1.

23. The subsystem of claim 22, wherein the expander is divided into a first zone and a second zone by a zoning technique.

24. The subsystem of claim 1, wherein the number of the at least one expander is 2.

25. The subsystem of claim 1, wherein the first SVC of the SVC pair is set in an active mode to process the I/O request sent from the initiator and the second SVC is set in a standby mode as a backup of the first SVC.

26. The subsystem of claim 8 or 9, wherein each the SVC in the SVC pair comprises an even multiple of the host-side I/O device ports, half of which being set in a active mode and the other half of which being set in a standby mode as a backup.

27. The subsystem of claim 8 or 9, wherein each of the at least one host-side I/O device port consists of 2×N PHYs, forming a 2N-PHY wide port, wherein N is a positive integer.

28. The subsystem of claim 27, wherein when one SVC of the SVC pair malfunctions or fails, each of the 2N-PHY wide ports of the surviving SVC is divided into two N-PHY ports, and all of the N-PHY ports take over the IDs of all of the 2N-PHY wide ports when no SVC failure happens.

29. The subsystem of claim 27, wherein the address of the first 2N-PHY wide port of the first SVC is equal to a base address and the address of the first 2N-PHY wide port of the second SVC is equal to the base address added by an appropriate value.

30. The subsystem of claim 29, wherein the appropriate value is 1.

31. The subsystem of claim 28, wherein an initialization procedure is started to assign the addresses of all the new N-PHY ports equal to the addresses of all the 2N-PHY wide ports before the device fails.

32. The subsystem of claim 31, wherein the initialization procedure is started by a kernel.

33. The subsystem of claim 32, wherein the kernel is stored in a ROM of the CPC.

34. The subsystem of claim 29, wherein the base address is stored in a backplane which has an electrical connection to each of the SVCs.

35. A storage virtualization system with host-side redundancy via SAS connectivity, comprising:
- at least one initiator for sending at least one I/O request; and
- at least one redundant storage virtualization subsystem using an SAS signal interconnect interface to couple to the initiator, each of the at least one redundant storage virtualization subsystem further comprising:
  - a storage virtualization controller (SVC) pair including a first SVC and a second SVC for executing an I/O operation in response to an I/O request sent from the at least one initiator, wherein each SVC of the SVC pair comprises at least one I/O device interconnect controller and the I/O device interconnect controller has at least one host-side port for coupling to the initiator;
  - at least one SAS expander disposed on the path of an I/O device interconnect between the SVC pair and the initiator for providing the device expansion function comprising addressing and routing; and
  - a physical storage device (PSD) array comprising at least one PSD for providing storing space to the subsystem.

36. The system of claim 35 further comprising more than two the redundant storage virtualization subsystems, which are adjacently cascaded.

37. The system of claim 36, wherein one of the at least one SAS expander of the first redundant storage virtualization subsystem and one of the at least one SAS expander of the last redundant storage virtualization subsystem are connected and the corresponding connection between the at least one SAS expanders of the first and the second of the more than two redundant storage virtualization subsystems is removed.

38. The system of claim 35 further comprising more than two the redundant storage virtualization subsystems, wherein one of which is connected to all the others.

39. The system of claim 36, 37, or 38, wherein the cascading or connection refers to the connection using ports of the SAS expanders of the redundant storage virtualization subsystems.

40. The system of claim 35, further comprising a plurality of the initiators connected to the at least one redundant storage virtualization subsystem.

41. The system of claim 35, wherein the initiator supports a multi-path I/O technology.

* * * * *